United States Patent
Wang et al.

(10) Patent No.: US 10,078,462 B2
(45) Date of Patent: Sep. 18, 2018

(54) METHODS AND SYSTEMS FOR PROVIDING HARDWARE SECURITY FUNCTIONS USING FLASH MEMORIES

(71) Applicants: CORNELL UNIVERSITY, Ithaca, NY (US); Yinglei Wang, Ithaca, NY (US); Wing-kei Yu, Ithaca, NY (US); Edwin C. Kan, Ithaca, NY (US); Gookwon E. Suh, Ithaca, NY (US)

(72) Inventors: Yinglei Wang, Ithaca, NY (US); Wing-kei Yu, Ithaca, NY (US); Edwin C. Kan, Ithaca, NY (US); Gookwon E. Suh, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/401,974

(22) PCT Filed: May 17, 2013

(86) PCT No.: PCT/US2013/041615
§ 371 (c)(1),
(2) Date: Nov. 18, 2014

(87) PCT Pub. No.: WO2013/173729
PCT Pub. Date: Nov. 21, 2013

(65) Prior Publication Data
US 2015/0169247 A1    Jun. 18, 2015

Related U.S. Application Data

(60) Provisional application No. 61/648,719, filed on May 18, 2012.

(51) Int. Cl.
*G06F 3/06* (2006.01)
*G06F 7/58* (2006.01)
(Continued)

(52) U.S. Cl.
CPC .......... *G06F 3/0622* (2013.01); *G06F 3/0652* (2013.01); *G06F 3/0679* (2013.01);
(Continued)

(58) Field of Classification Search
None
See application file for complete search history.

(56) References Cited

U.S. PATENT DOCUMENTS 4,389,636 A * 6/1983 Riddle, Jr. ............ H04L 25/491
341/71
2007/0255777 A1* 11/2007 Saitoh ..................... G06F 7/588
708/251
(Continued)

FOREIGN PATENT DOCUMENTS

KR    100543452 B1    1/2006

OTHER PUBLICATIONS

Prabhu, P. et al. Extracting Device Fingerprints from Flash Memory by Exploiting Physical Variations. In: 4th International Conference, TRUST (Jun. 2011) vol. 6740, pp. 188-201.

*Primary Examiner* — Jared I Rutz
*Assistant Examiner* — Stephanie Wu
(74) *Attorney, Agent, or Firm* — Burns & Levinson LLP; Orlando Lopez

(57) ABSTRACT

Methods and system for providing a security function, such as random number generation, fingerprinting and data hiding, using a Flash memory. The methods and systems do not require carefully design specific circuits, can be implemented in all flash memory device. The fingerprinting methods and systems do not require a long time to generate a read and the data hiding is decoupled from Flash memory content.

30 Claims, 18 Drawing Sheets

(51) Int. Cl.
  *G11C 16/22* (2006.01)
  *G06F 21/71* (2013.01)
  *G06F 11/10* (2006.01)
  *G06F 1/02* (2006.01)
  *G06F 12/02* (2006.01)

(52) U.S. Cl.
  CPC .............. *G06F 7/58* (2013.01); *G06F 7/582* (2013.01); *G06F 7/588* (2013.01); *G11C 16/22* (2013.01); *G06F 1/02* (2013.01); *G06F 11/1068* (2013.01); *G06F 11/1072* (2013.01); *G06F 12/0246* (2013.01); *G06F 21/71* (2013.01); *G06F 2206/1014* (2013.01); *G06F 2212/2022* (2013.01)

(56) References Cited

U.S. PATENT DOCUMENTS

| | | | |
|---|---|---|---|
| 2008/0094923 A1 | 4/2008 | Kwon et al. | |
| 2008/0231377 A1* | 9/2008 | Kravtsov | G06F 7/58 331/46 |
| 2008/0301210 A1* | 12/2008 | Dover | G06F 1/02 708/250 |
| 2009/0043951 A1 | 2/2009 | Shalvi et al. | |
| 2009/0309646 A1* | 12/2009 | Kobayashi | G06F 7/588 327/355 |
| 2010/0057820 A1 | 3/2010 | Matsumoto et al. | |
| 2011/0044104 A1 | 2/2011 | Kang et al. | |
| 2012/0218818 A1* | 8/2012 | Han | G11C 11/5628 365/185.03 |
| 2014/0312918 A1* | 10/2014 | Massetti | G01R 29/26 324/613 |
| 2015/0095550 A1* | 4/2015 | Khan | G06F 3/061 711/103 |
| 2015/0199177 A1* | 7/2015 | Braganca | G06F 7/588 365/158 |

* cited by examiner

I-V CURVES

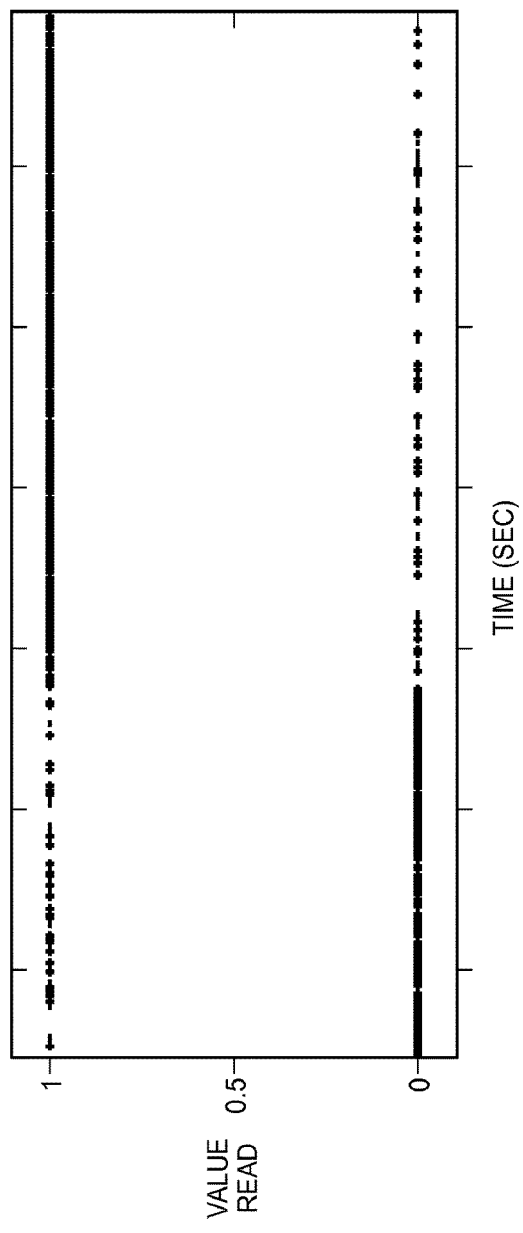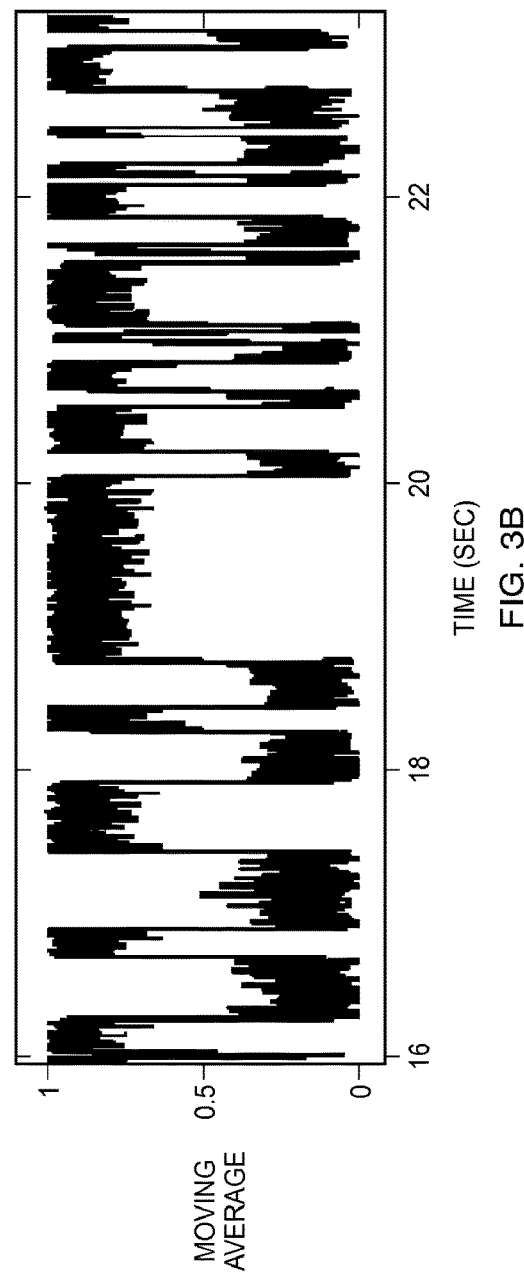

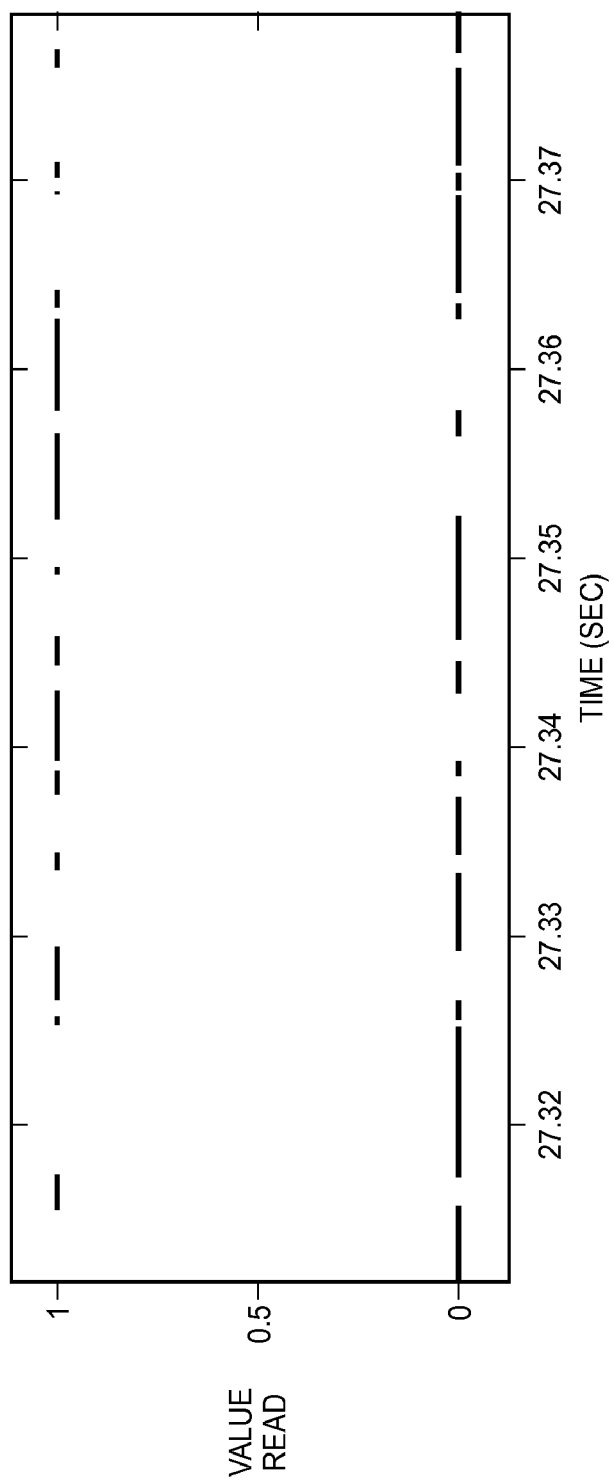

Algorithm I: Encoding

*Part A - Composing the message*
1 For each selected page in a block
2   Generate the group for each message bit via the page hiding key
3   Assign each group 0 or 1 according to the embedded data
4   For each bit
5     If its group will represent a message "1"
6       Set it to be programmed 0
7     Else
8       Set it to be programmed 1
9     End if
10  End for
11 End for

*Part B - Writing the message to Flash*
1 For each selected block
2   For $i = 1, 2, ..., N$ ($N$ is the number of Hiding PE cycles)
3     Erase the block
4     Program every selected page
5   End for
6 End for

FIG. 12

Algorithm 1: Encoding

*Part A - Reading the program time from Flash*
1  For each selected block
2      Erase the block
3      Program every bit in the block to 0
4      Erase the block
5      For each selected page
6          For $i = 1, 2, ..., M$
7              Partial program the page to 0 (abort a program operation after time $T$)
8              Read the page
9              For each bit in the page
10                 If the bit changed from 1 to 0
11                     set *programtime* for this bit to $i$
12                 End if
13             End for
14         End for
15         For each bit
16             If the bit did not flip
17                 Set its *programtime* to be $M + 1$
18             End if
19         End for
20     End for
21     Erase the block
22 End for

*Part B - Extracting the payload message*
1  For each selected block
2      For each selected page
3          Calculate the median $X$ of the program times for all the bits
4          For each bit
5              If its *programtime* $> (X/2)$
6                  Set *programtime* to 1
7              Else
8                  Set *programtime* to 0
9              End if
10         End for
11         Generate the group for each message bit with the page hiding key
12         For each group
13             Calculate the average program time for the group
14             If the average is less than $Th$
15                 Recover the message bit: 1
16             Else
17                 Recover the message bit: 0
18             End if
19         End for
20     End for
21 End for

FIG. 13

```
------------------------------------------------------------------
    RESULTS FOR THE UNIFORMITY OF P-VALUES AND THE
PROPORTION OF PASSING SEQUENCES
------------------------------------------------------------------
    P-VALUE      PROPORTION     STATISTICAL TEST
    0.122325     10/10          Frequency
    0.911413     10/10          Block Frequency
    0.534146     10/10          CumulativeSums
    0.066882     10/10          CumulativeSums
    0.534146     10/10          Runs
    0.350485     10/10          LongestRun
    0.739918     10/10          Rank
    0.739918     10/10          FFT
    0.213309     10/10          NonOverlappingTemplate
    0.739918     10/10          NonOverlappingTemplate
    0.350485     10/10          OverlappingTemplate
    0.911413     9/10[1]        Universal
    0.534146     10/10          ApproximateEntropy
    ----         5/5            RandomExcursions
    ----         5/5            RandomExcursions
    ----         5/5            RandomExcursionsVariant
    ----         5/5            RandomExcursionsVariant
    0.739918     10/10          Serial
    0.350485     10/10          Serial
    0.534146     10/10          LinearComplexity
------------------------------------------------------------------
    [1]The minimum pass rate for each statistical test is 8 for a sample size of
10 binary sequences, and 4 for a sample size of 5 sequences.
------------------------------------------------------------------
```

FIG. 15

METHODS AND SYSTEMS FOR PROVIDING HARDWARE SECURITY FUNCTIONS USING FLASH MEMORIES

CROSS-REFERENCE TO RELATED APPLICATIONS

This application is a U.S. national stage application under 35 U.S.C. 371 of International Application No. PCT/US13/41615 filed on May 17, 2013 and entitled METHODS AND SYSTEMS FOR PROVIDING HARDWARE SECURITY FUNCTIONS USING FLASH MEMORIES, which in turn claims priority to U.S. Provisional Patent Application No. 61/648,719 filed on May 18, 2012, which is incorporated by reference herein in its entirety for all purposes.

STATEMENT REGARDING FEDERALLY-SPONSORED RESEARCH OR DEVELOPMENT

This invention was made under National Science Foundation grant No. CNS-0932069 and Air Force Office of Scientific Research Contract No. FA9550-09-1-0131. The government has certain rights to this invention.

BACKGROUND

A portion of the disclosure of this patent document contains material, which is subject to copyright protection. The copyright owner has no objection to the facsimile reproduction by anyone of the patent document or the patent disclosure as it appears in the Patent and Trademark Office or WIPO patent file or records, but otherwise reserves all copyright rights whatsoever.

This invention relates generally to hardware security function, and, more particularly, to providing hardware security function using a Flash memory.

Flash memory has gained a ubiquitous place in the computing landscape today. Virtually all mobile devices such as smartphones and tablets rely on Flash memory as their non-volatile storage. Flash memory is also moving into laptop and desktop computers, intending to replace the mechanical hard drive. Floating-gate non-volatile memory is even more broadly used in electronic applications with a small amount of non-volatile memory. For example, even 8-bit or 16-bit microcontrollers for embedded systems commonly have on-chip EEPROMs to store instructions and data. Many people also carry Flash memory as standalone storage medium as in USB memory sticks and SD cards.

Both hardware random number generators (RNGs) and device fingerprints provide important foundations in building secure systems. For example, true randomness is a critical ingredient in many cryptographic primitives and security protocols; random numbers are often required to generate secret keys or prevent replays in communications. While pseudo-random number generators are often used in today's systems, they cannot provide true randomness if a seed is reused or predictable. As an example, a recent study showed that reuse of virtual machine (VM) snapshots can break the Transport Level Security (TLS) protocol due to predictable random numbers. Given the importance of a good source of randomness, high security systems typically rely on hardware RNGs.

Hardware random number generators generate random numbers from high-entropy sources in the physical world. Theoretically, some random physical processes are completely unpredictable. Therefore, hardware random number generators provide better random numbers in terms of randomness than software based pseudo-random number generators.

Thermal noise and other system level noise are the common entropy sources in recently proposed hardware random number generators. In, the phase noise of identical ring oscillators is used as the entropy source. In, the differences in path delays are used. In and, the metastability of flip-flops or two cross coupled inverters are used. Basically, the entropy source of these RNG designs is thermal noise and circuit operational conditions. These hardware random number generators can usually achieve high throughput because the frequency of the entropy sources is high. One common characteristic of these hardware random generators is that they all need carefully designed circuits where process variations should be minimized so that noises from the entropy source can be dominant.

Instead of conventional authentication based on a secret key and cryptographic computation, researchers have recently proposed to use the inherent variation in physical characteristics of a hardware device for identification and authentication. Process variation in semiconductor foundries is a common source of hardware uniqueness, which is out of the control of the designer. A unique fingerprint can be extracted and used to identify the chip, but cannot be used for security applications because it can be simply stored and replayed.

For security applications, Physical Unclonable Functions (PUFs) have been proposed. A PUF can generate many fingerprints per device by using complex physical systems whose analog characteristics cannot be perfectly replicated. Pappu initially proposed PUFs using light scattering patterns of optically transparent tokens. In silicon, researchers have constructed circuits, which, due to random process variation, emit unique outputs per device. Some silicon PUFs use ring oscillators or race conditions between two identical delay paths. These PUFs are usually implemented as custom circuits on the chip. Recently, PUFs have been implemented without additional circuitry by exploiting metastable elements such as SRAM cells, which have unique value on start-up for each IC instance, or in Flash memories. Unfortunately, obtaining fingerprints from bi-stable elements requires a power cycle (power off and power on) of a device for every fingerprint generation. The previous approach to fingerprinting Flash only works for a certain types of Flash chips and takes long time (100 seconds for one fingerprint) because it relies on rare errors called program disturbs.

With the advent of information technology, digital steganography has become the subject of considerable study. A large body of work has focused on hiding information within digital files, such as images, videos, audio files, text, and others. These schemes usually hide data in unused meta-data fields, or by exploiting noise in the digital content itself; i.e. altering colors slightly in an image or frequency components in an audio file. In all cases the hidden data is tied to the data in the digital file. A recent proposal takes a different approach: using the fragmentation pattern of digital files in a file system as a covert channel, avoiding tampering with the digital content itself. However, hidden data is still innately tied to the existence of a digital file. Also, modifying hard drive firmware has been investigated as a potential way to hide information. Data is hidden in sectors marked as unusable at the firmware level (instead of the OS or filesystem level), which renders the sectors inaccessible to most software and complicates recovery, as it is difficult to tell legitimately bad sectors from ones used for hiding. There is a need for random generators that do not require carefully designed circuits.

There is also a need for fingerprinting that can be implemented in all Flash memory devices and that does not require a long time to generate or read. There is a further need for data hiding that is decoupled from the Flash memory content and instead tied to the physical object.

BRIEF SUMMARY

Methods and system for providing a security function, such as random number generation, fingerprinting and data hiding, using a Flash memory are presented herein below. The methods and systems of these teachings do not require carefully design specific circuits, can be implemented in all flash memory device, the fingerprinting methods and systems do not require a long time to generate a read and the data hiding is decoupled from Flash memory content.

In one or more embodiments, the method of these teachings for providing a security function using a Flash memory includes partially programming the Flash memory, observing characteristics resulting from the partially programming and at least one read operation subsequent to partial programming, the characteristics being used to perform the security function.

In one or more embodiments, the system of these teachings for providing a security function using a Flash memory includes one or more processors and one or more computer usable media, the computer usable media having computer readable code embodied therein, the computer readable code, when executed by the processors, results in partially programming the Flash memory, observing characteristics resulting from the partially programming and at least one read operation subsequent to partial programming, the characteristics being used to perform the security function.

For a better understanding of the present teachings, together with other and further objects thereof, reference is made to the accompanying drawings and detailed description and its scope will be pointed out in the appended claims.

BRIEF DESCRIPTION OF THE DRAWINGS

FIGS. 3a, 3b are graphical representations of observations of RTN with thermal noise in Flash memory: (a) Time domain; (b) Moving average of 29 points on the time domain;

FIG. 4 is a graphical representation of observations of RTN in Flash memory (time domain);

FIG. 12 is a pseudocode listing of one embodiment of the method of these teachings for hiding information;

FIG. 13 is a pseudocode listing of one embodiment of the method of these teachings for decoding hidden information;

FIG. 15 is a tabular representation of results for one exemplary embodiment of these teachings;

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

"Partial programming," as used herein, is a procedure in which, first, a page in the Flash memory is erased, a control component issues a program command to write, and then issues a reset command after an appropriate time period to abort the program, thereby leaving a page partially programmed so that noise can affect digital outputs.

"Flash memory," as used herein refers to Flash or other floating-gate non-volatile memory.

Methods and system for providing a security function, such as random number generation, fingerprinting and data hiding, using a Flash memory are presented herein below.

For reference, Flash memory background is presented herein below.

Presented herein below is background material on Flash memory and its operating principles to aid understanding of the Flash-based TRNG, fingerprint generation information hiding scheme of these teachings.

A. Floating Gate Transistors

Figure 1A:
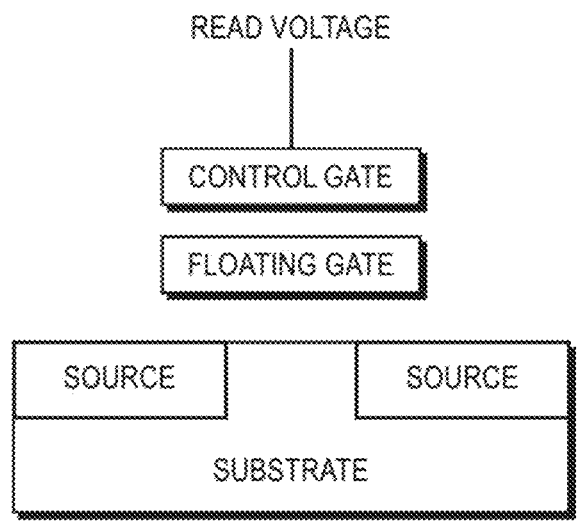
FIGS. 1a, 1b are a schematic representation of a Flash memory and a graphical representation of characteristics of the Flash memory.
Figure 1B:
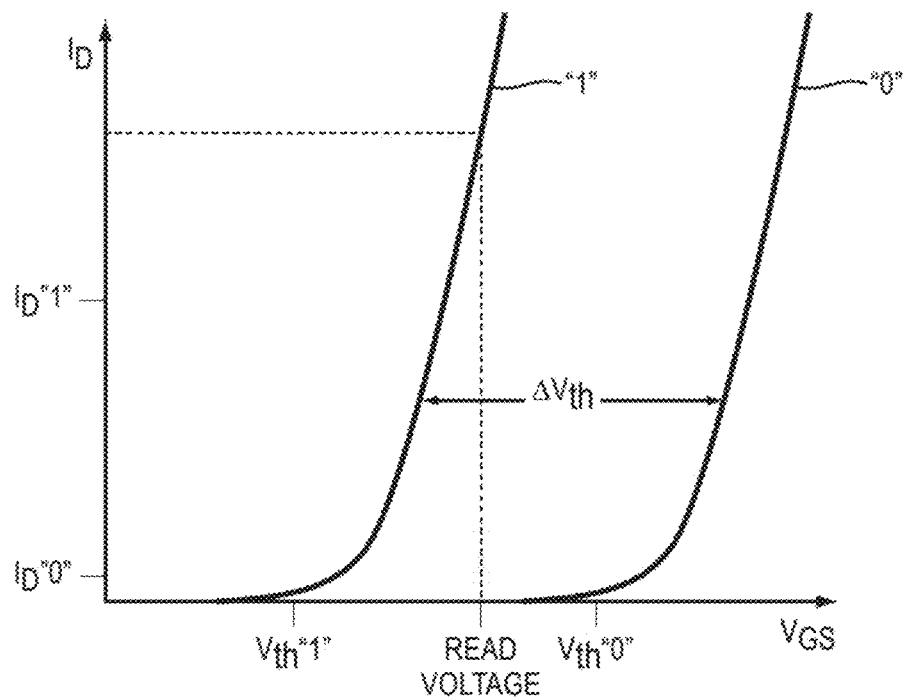

Flash memory is composed of arrays of floating-gate transistors. A floating-gate transistor is a transistor with two gates, stacked on top of each other. One gate is electrically insulated (floating). FIG. 1 shows an example of a floating-gate device. The control gate is on top. An insulated conductor, surrounded by oxide, is between the control gate and the channel. This conductor is the floating gate. Information is stored as the presence or absence of trapped charge on the floating gate. The trapped negative charge reduces the current flowing through the channel when the N-type MOS transistor is on. This current difference is sensed and translated into the appropriate binary value. Flash cells without charge on their floating-gate allow full current flow in the channel and hence are read as a binary "1". The presence of charge on the floating-gate will discourage the presence of current in the channel, making the cell store a "0". Effectively, the charge on the floating-gate increases the threshold voltage (Vth) of a transistor. Single-level cells (SLC) store one bit of information per cell by using two threshold voltage levels. Multi-level cells (MLC) store more than one bit by more finely dividing the threshold voltage levels: for example, four levels can be used to store two bits per cell.

B. Flash Organization and Operation

At a high-level, Flash memory provides three major operations: read, erase, and program (write). In order to read a bit in a Flash cell, the corresponding transistor is turned on and the amount of current is detected. A write to a Flash cell involves two steps. First, an erase operation pushes charge off the floating-gate by applying a large negative voltage on the control gate. Then, a program (write) operation stores charge on the floating-gate by selectively applying a large positive voltage if the bit needs to be zero.

An important concept in Flash memory operation is that of pages and blocks. Pages are the smallest unit in which data is read or written, and are usually 2 KB to 8 KB. Blocks are the smallest unit for an erase operation and made up of several pages, usually 32-128 pages. Note that Flash does not provide bit-level program or erase. To read an address from a Flash chip, the page containing the address is read. To update a value, the block that includes the address must be first erased. Then, the corresponding page is written with an update and other pages in the block are restored.

C. Aging

Flash requires high voltages to store and erase information. The voltages involved place great stress on the device oxide; each program operation and each erase operation slightly damages the oxide, wearing out the device. After thousands of program and erase cycles, the oxide could have sustained enough damage to render the bit non-operational, leaving it in a stuck-at state or in a leaky state that cannot reliably hold information over a period of time. Flash is usually guaranteed by the manufacturer up to a certain number of program and erase cycles. Even before failures, the stress causes the cell's analog characteristics to change. In particular, the program time that is required to flip a state from '1' to '0' for a cell tends to reduce as the number of program/erase (PE) cycles increases for that cell. We exploit this program time shift in order to hide information.

D. Partial Programming

The information hiding scheme of these teachings relies on the measurement of program time, the time it takes to program a Flash cell, at individual cell granularity. However, the standard Flash memory interface requires all bits in a page to be programmed together. Normally, a program operation on a page is held for a long enough time that any cell level variation within a page is overcome. Therefore, the normal program time only reveals how long programming the entire page takes, not how long it takes to program individual bits. To find the program time on a per-cell basis, we use a technique called "partial programming." The standard Flash memory interfaces allow the "partial program" of a cell by aborting a program operation before completion. If the program operation is interrupted, the Flash cell may be in an unreliable state that could be interpreted as 1 or 0. Further "partial programs" will accumulate charge on the floating gate and eventually result in the cell entering a stable programmed state, as if a full program was applied. Effectively, the number of partial program operations to flip a bit from 1 to 0 represents the program time for the bit. In this sense, the "partial programming" technique is used in these teachings to find program time for individual cells. After a partial program to a page, the page is read and the state of each bit recorded. When a bit changes to the programmed state (from 1 to 0), the number of partial programs required to flip the bit is noted as the bit's program time.

In one or more embodiments, the method of these teachings for providing a security function using a Flash memory includes partially programming the Flash memory, observing characteristics resulting from the partially programming and at least one read operation subsequent to partial programming, the characteristics being used to perform the security function.

In one instance, the security function is random number generation or fingerprinting; and partial programming includes (i) partially programming one or more pages of the Flash memory, (ii) reading said the one or more pages, and repeating (i) and (ii) until changes in bit value are observed. In another instance, observing characteristics includes observing a number of partial programming operations required for a predetermined event.

In one embodiment, the random number generator of these teachings uses a device effect called Random Telegraph Noise (RTN) as the source of randomness. In general, RTN refers to the alternating capture and emission of carriers at a defect site (trap) of a very small electronic device, which generates discrete variation in the channel current. The capture and emission times are random and exponentially distributed. RTN behavior can be distinguished from other noise using the power spectrum density (PSD), which is flat at low frequencies and $1/f^2$ at high frequencies. In Flash memory, the defects that cause RTN are located in the tunnel-oxide near the substrate. The RTN amplitude is inversely proportional to the gate area and nearly temperature independent. As Flash memory cells shrink, RTN effects become relatively stronger and their impact on the threshold distribution of Flash memory cells, especially for multi-level cells, can be significant. Because RTN can be a major factor in Flash memory reliability, there have been a large number of recent studies on RTN in Flash memory from a reliability perspective.

While RTN is a challenge to overcome from the perspective of Flash memory operations, it can be an ideal source of randomness. RTN is caused by the capture and emission of an electron at a single trap, and is a physical phenomenon with random quantum properties. Quantum noise can be seen as the "gold-standard" for random number generation because the output of quantum events cannot be predicted. As Flash memory cells scale to smaller technology nodes, the RTN effect will become stronger. Moreover, RTN behavior will still exist with increasing process variation and at extremely low temperatures.

As digital devices, Flash memory is designed to tolerate analog noise; noise should not affect normal memory operations. In order to observe the noise for random number generation, a Flash cell needs to be in an unreliable state between well-defined erase and program states. Interestingly, the present teachings have shown that Flash cells can be put into the in-between state using the standard digital interface. In a high level, the approach first erases a page, issues a program command, and then issues a reset command after an appropriate time period to abort the program. This procedure leaves a page partially programmed so that noise can affect digital outputs. The present teachings have shown that the outcome of continuously reading a partially programmed bit oscillates between 1 and 0 due to noise.

Figure 2:
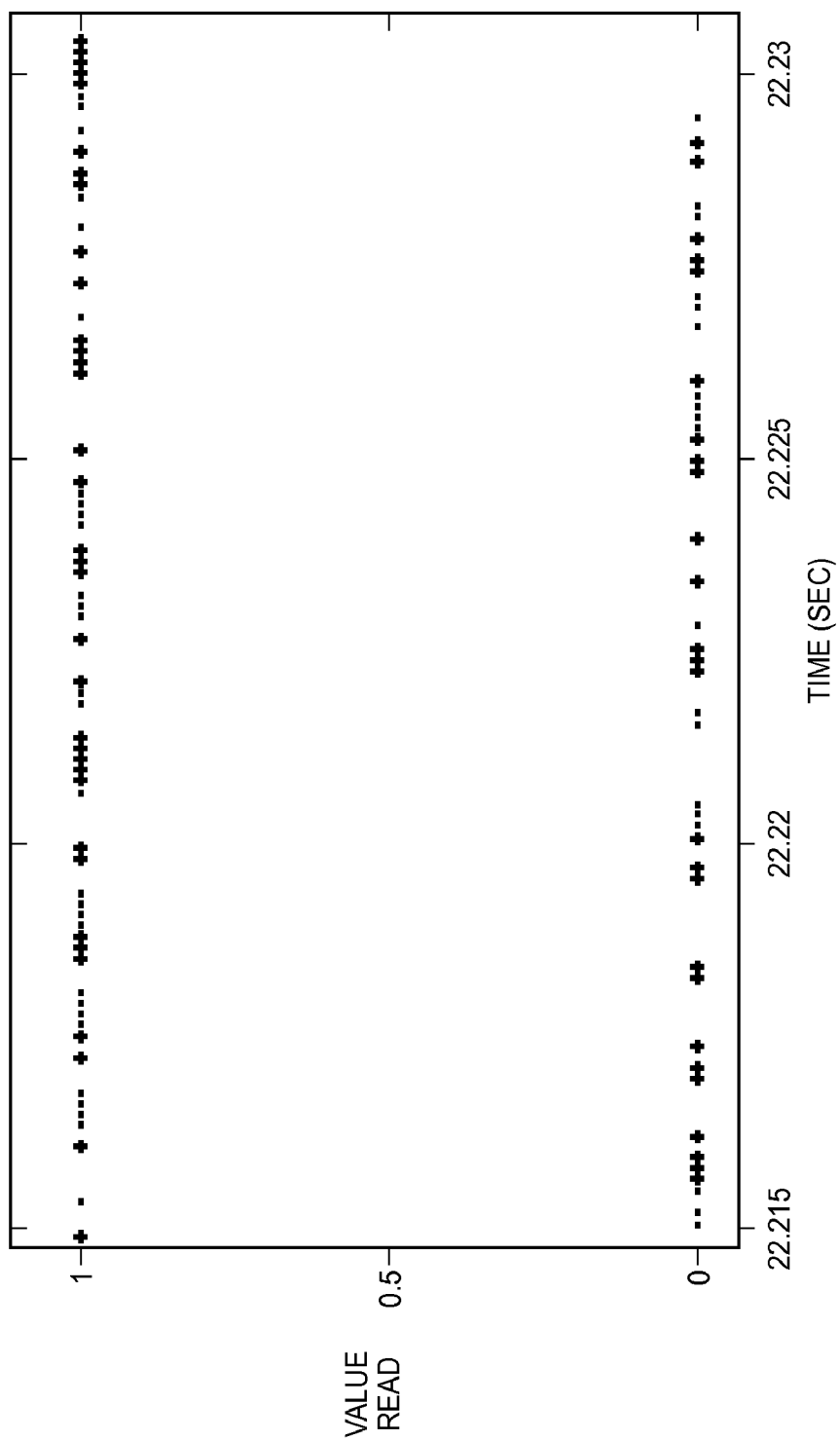
FIG. 2 is a graphical representation of observations of Thermal noise in Flash memory.

For Flash memory in practice, experiments show that two types of noise coexist: thermal noise and RTN. Thermal noise is white noise that exists in nearly all electronic devices. RTN can be observed only if a surface trap exists, the RTN amplitude is larger than that of thermal noise, and the sampling frequency (speed for continuous reads) is high enough. If any of these three conditions is not satisfied, only thermal noise will be observed as in FIG. 2. In the case of thermal noise, a bit oscillates between the two states quickly, and the power spectral density (PSD) indicates white noise.

In the case that the RTN amplitude is comparable to thermal noise, a combination of RTN and thermal noise is observed as shown in FIG. 3. This is reflected by the density change of 1s in the continuous reading. A moving average on the time domain helps to visualize the density change. The PSD of the result shows $1/f^2$ spectrum at low frequencies and becomes flat at high frequencies.

In some cases, the RTN amplitude is very high and dominates thermal noise. As a result, only RTN behaviors are visible through digital interfaces for these bits. As shown in FIG. 4, continuous reads show clear clusters of 1s and 0s in the time domain. The power spectral density (PSD) of these bit sequences shows a clear RTN pattern of $1/f^2$.

Figure 5A:
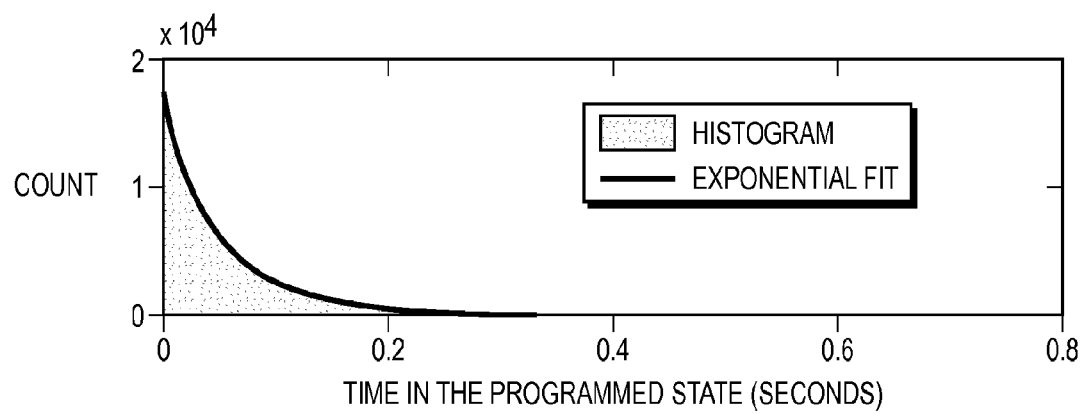
FIGS. 5a, 5b are graphical representations of power spectral density of observations of bit sequences: (a) Distribution of time in the programmed state; (b) Distribution of time in the erased state.
Figure 5B:
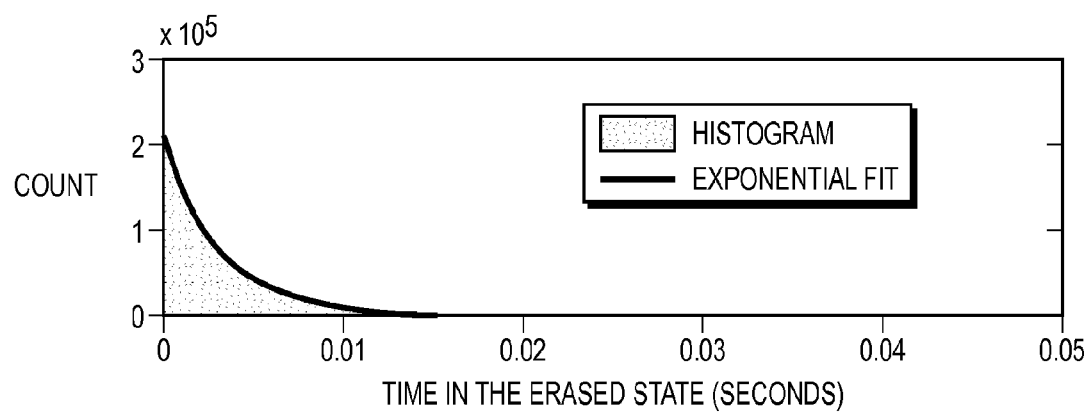

For a bit with nearly pure RTN behavior, present teachings have shown that the error pattern corresponds to RTN by plotting the distributions of number of consecutive reads in an erased state ("1"), up periods, and number of consecutive reads in a programmed state ("0"), down periods. As shown in FIG. 5, both up time and down time nicely fit an exponential distribution as expected. Overall, present teachings have shown that both RTN and thermal noise exist in Flash memory and can be observed through a digital interface. While both noise types can be used for random number generation, one embodiment uses RTN, since it is more robust to temperature changes.

In one embodiment of the method of these teachings for providing a random number generator using a Flash memory, where the characteristics are a number of consecutive reads in a erased state ("1") and a number of consecutive reads in a programmed state ("0"), the partially programming the Flash memory and the observing the characteristics include erasing a block, partially programming a page, identifying bits in the page that exhibit Random Telegraph Noise (RTN) or RTN and thermal noise, determining the number of consecutive reads in an erased state ("1") and the number of consecutive reads in a programmed state ("0") for the identified bits, generating a sequence of the number of consecutive reads in an erased state and the number of consecutive reads in a programmed state for the identified bits; and converting the sequence into a binary number sequence for the identified bits. In some embodiments, partially programming a page comprises partially programming a page a predetermined number of times.

In Flash memory devices, RTN manifests as random switching between the erased state (consecutive 1s) and programmed state (consecutive 0s). At a high-level, the Flash random number generator (RNG) of these teachings identifies bits with RTN behavior, either pure RTN or RTN combined with thermal noise, and uses a sequence of time in the erased state (called up-time) and the time in the programmed state (called down-time) from those bits. In order to produce random binary outputs, the RNG converts the up-time and down-time sequence into a binary number sequence, and applies the von Neumann extractor for de-biasing. Present teachings have shown that thermal noise itself is random and does not need to be filtered out.

In one instance of the method of these teachings for providing random number generation using a Flash memory, identifying bits includes:
(a) reading a predetermined number of bytes in the page;
(b) repeating (a) a predetermined number of times;
(c) recording an outcome of the reading for each bit in the predetermined number of bytes;
(d) determining, if the bit in the predetermined number of bytes is not selected, whether the bit is selected for random number generation;
(e) recording a number of times the bit was partially programmed;
(f) identifying, if a bit is selected, whether the bit has Random Telegraph Noise (RTN) or has RTN and thermal noise;
(g) partially programming a page; and
(h) repeating (a)-(g) until all bits in the predetermined number of bytes have been considered.

In another instance of the method of these teachings for providing random number generation using a Flash memory, the method also includes partially programming all selected bits so that RTN is observed. In yet another instance of the method of these teachings for providing random number generation using a Flash memory, determining the number of consecutive reads includes reading the selected bits a predetermined number of times, and recording the number of consecutive reads in the erased state and the number of consecutive reads in the programmed state for each selected bit.

In a further instance of the method of these teachings for providing random number generation using a Flash memory, determining whether the bit is selected includes determining whether reading the bit produces a same result a predetermined percent of the number of times, and selecting the bit if the determining is negative.

Algorithm I shows the overall RNG algorithm. To generate random numbers from RTN, the first step is to identify bits with RTN or both RTN and thermal noise. To do this, one block in Flash memory is erased and then multiple incomplete programs with the duration of T are applied. After each partial program, a part of the page is continuously read N times and the outcome is recorded for each bit. In one instance, the first 80 bits (10 bytes) in a page are read for 1,000 times. For each bit that has not been selected yet, the algorithm checks if RTN exists using CheckRTN( ) and marks the bit location if there is RTN. As an optimization, the algorithm also records the number of partial programs when a bit is selected. The algorithm repeats the process until all bits are checked for RTN. The second step is to partially program all of the selected bits to an appropriate level so that they will show RTN behavior. Finally, the algorithm reads the selected bits M times, records a sequence of up-time and down-time for each bit, and converts the raw data to a binary sequence.

Algorithm I Overall Flash RNG algorithm

```
Erase a block;
Num = 0; do {
Partially program a page for T;
Num++;
Read Nbytes in a page N times, and record a
trace for each bit - trace[bit];
For each bit in Nbytes, not selected yet
If (CheckRTN(trace[bit]) == true) {
Selected[bit] = yes;
NumProgram[bit] = Num;
}
End for
} repeat until most bits are programmed.
ProgramSelectBits(Selected);
Read selected bits M times, and record up-
time and down-time;
For each bit
ConvertToBinary(rawdata);
End for
```

In yet another instance of the method of these teachings for providing a random number generator using a Flash memory, identifying whether the bit has RTN or RTN plus thermal noise includes obtaining a power spectral density for the up-time or down-time, comparing a slope of the power spectral density for frequencies higher than a predetermined frequency to a predetermined threshold, identifying as having RTN if the slope is at least equal to the predetermined threshold; and identifying as having RTN plus thermal noise if slope is less than the predetermined threshold.

The function CheckRTN( ) in Algorithm II below determines whether there is RTN in a bit based on a trace from N reads. The algorithm first filters out bits that almost always (more than 98%) produce one result, either 1 or 0. For the bits with enough noise, the algorithm uses the power spectral density (PSD) to distinguish RTN from thermal noise; PSD for RTN has a form of $1/f^2$ at a high frequency. To check this condition, the algorithm computes the PSD, and converts it to a log-scale in both x and y axes. If the result has a slope less than $T_{slope}$ (in one instance, not a limitation of these teachings, −1.5 is used, a preferred value is −2) for all frequencies higher than $T_{freq}$ (in one instance, not a limitation of these teachings, 200 Hz is used), the algorithm categorizes the bit as RTN only. If the PSD has a slope less than $T_{slope}$ for any interval larger than Invl (in one instance, not a limitation of these teachings, 0.2 is used) at a high frequency, the bit is categorized as a combination of RTN and thermal noise.

Algorithm II Determine whether there is RTN in a bit

```
If trace[bit] has over 98% 1/0s Return false;
End if
Calculate the power spectrum density (PSD); Convert PSD to the log
scale in both x-y;
```

-continued

```
If PSD slope is always < Tslope for all high frequency (> Tfreq)
Return RTN
End if
If PSD slope is < Tslope at least one interval (Invl) at a high frequency
(> Tfreq)
Return RTN-Thermal
End if
```

In one instance of the method of these teachings for providing random number generation using a Flash memory, wherein partially programming all selected bits so that RTN is observed includes partially programming the page a first preselected number of times less than the recorded number of times the page was partially programmed, and:

(i) partially programming the page for a predetermined time;

(ii) reading the bit in the predetermined number of times;

(iii) determining maximum and minimum for moving averages (iv) determining whether the maximum is greater than a first predetermined threshold and the minimum is less than a second predetermined threshold; and repeating (i)-(iv) until the maximum is greater than the first predetermined threshold and the minimum is less than the second predetermined threshold and a number of repetitions is at most equal to a second preselected number of times.

In one instance, the moving averages are performed by selecting a window size as the mean of a smallest of "up" state or "down" state as obtained from Algorithm II, disclosed hereinabove, and obtaining the average of the bits in the window. For the moving averages the window is moved one bit at a time to the right.

In one instance, the first preselected number for partial program operations (K) is selected to ensure that bits are not overprogrammed. In one exemplary embodiment, not a limitation of these teachings, the first preselected number is the range of 3 to 10 and typically 5. The second preselected number is selected from the results of the moving averages. In one exemplary embodiment, not a limitation of these teachings, the second preselected number is the range of 15 to 30 and typically 20. The second preselected number (L) depends on the length of time of each partial program ("T" in Algorithm III) and is selected to exit the loop when the bit is already overprogrammed.

The function ProgramSelectBits( ) in Algorithm III below programs selected bits to a proper level where RTN can be observed. Essentially, the algorithm aims to take each bit to the point near where they were identified to have RTN. The number of partial programs that were required to reach this point before were recorded in NumProgram[Bit]. For each selected bit, the algorithm first performs partial programs with the duration of T based on the number recorded earlier (NumProgram[Bit]−K). Then, the algorithm performs up to L more partial program operations until a bit shows RTN behavior. The RTN behavior is checked by reading the bit N times, and see if the maximum of moving averages is greater than a threshold (in one instance, not a limitation of these teachings, TMax=0.7) and the minimum is less than another threshold (in one instance, not a limitation of these teachings, TMin=0.3).

Algorithm III Program selected bits to proper levels where RTN could be observed.

```
For each selected bit
Do (NumProgram[bit]-K) partial programs;
do {
Partially program the bit for T;
Read the bit N times;
Find Max and Min for moving averages;
If Max > TMax and Min < TMin
Break;
End if
} repeat up to L times
End for
```

Finally, the function ConvertToBinary( ) converts the raw data to a binary random sequence. For bits with both RTN and thermal noise, the up-time and down-time tend to be short. So only the LSBs of these numbers are used. Essentially, for every up-time and down-time, the algorithm produces 1 if the time is odd and 0 otherwise. Effectively, this is an even-odd scheme. For bits with perfect RTN behavior, up-time and down-time tend to be longer and we use more LSBs from the recorded up/down-time. In this case, a bit based on the LSB is first produced, then the second LSB, the third LSB, and so on until all extracted bits become 0. Finally, for both methods, the von Neumann de-biasing method is applied. The method takes two bits at a time, throws away both bits if they are identical, and takes the first bit if different. This process is described in Algorithm IV below.

Algorithm IV Convert the raw data to binary random sequence.

```
If the bit has both RTN and thermal noise For each up/down-time in raw
data
Output = LSB(up/down-time);
End for
End if
If the bit has only RTN
do {
For each up/down-time in raw data Output = LSB(up/down-time);
Shift right up/down-time by one bit; End for
} repeat until all up/down time are zero; End if
```

Perform Von Neumann De-Biasing

The stability of the bits in the partially programmed state is also important. The stability is defined herein as how long a bit stays in the partially programmed state where RTN behavior can be observed. This is determined by the retention time of the Flash memory chip and the amplitude of the RTN compared to the designed noise margin. Assume the amplitude of the RTN is Ar, the noise margin of Flash memory is An, and the Flash retention time is 10 year, then the stable time for random number generation after partial programming will be roughly Ts=Ar/An*10 years. This means that after time Ts, a bit needs to be reset and reprogrammed. In these teachings, the bit that is shown in FIG. 5 was still showing ideal RTN behavior even after 12 hours.

In another embodiment of the method of these teachings for providing a security function using a Flash memory, where the security function is fingerprinting, where a characteristic for each bit is a number of partial programmings required for each bit to flip from an erased state to a programmed state, and wherein the partially programming the Flash memory and the observing the characteristics include erasing a page of the Flash memory, and determining, for predetermined percentage of bits in the page, the number of partial programmings required for each bit to flip from an erased state to a programmed state, the predetermined percentage selected so that most bits are programmed, the number of partial programming for each bit in the predetermined percentage constituting a fingerprint for the page and the Flash memory.

In one instance, in the method of these teachings for providing fingerprints using a Flash memory, determining, for predetermined percentage of bits in the page, the number of partial programmings required for each bit to flip from an erased state to a programmed state includes:

(a) partially programming the page;
(b) reading one bit;
(c) determining whether the one bit has flipped to the programmed state;
(d) setting the characteristic for the one bit equal to the number of partial programmings performed, if the one bit has flipped to the programmed state;
(e) repeating (b)-(d) until all bits in the page which have not been determined to have flipped are read; and
(f) repeating (a)-(e) until the predetermined percentage of bits have flipped to the programmed state.

In another instance, the method of these teachings for providing fingerprints using a Flash memory includes generating a binary fingerprint from the number of partial programmings required for each bit to flip from an erased state to a programmed state.

Flash memory is subject to random process variation like any other semiconductor device. Because Flash is fabricated for maximum density, small variations can be significant. Process variation can cause each bit of a Flash memory to differ from its neighbors. While variation may affect many aspects of Flash cells, our fingerprinting technique exploits threshold voltage variations. Variations in doping, floating gate oxide thickness, and control-gate coupling ratio can cause the threshold voltage of each transistor to vary. Because of this threshold voltage variation, different Flash cells will need different times to be programmed.

An embodiment of a fingerprinting scheme based on partial programming is disclosed herein below. A page on a Flash chip was repeatedly partially programmed. After each partial program, some bits will have been programmed enough to flip their states from 1 to 0. For each bit in the page, the order in which the bit flipped (number of partial programs required for the bit to flip) were recorded. Pseudocode is provided in Algorithm V. In one instance, T is chosen to be 29.3 us. A short partial program time provide a better resolution to distinguish different bits with the cost of increased fingerprinting time. It is not strictly require that all bits to be programmed, in order to account for the possibility of faulty bits.

Algorithm V Extract the order in which bits in a page are reach the programmed state.

```
Choose a partial programming time T (below the rated program time).
Nbits = number of bits in one page Order = 1;
Initialize BitRank[Nbits] to 0,
do {
Partially program a page for T;
For all programmed bits do
BitRank[programmed bit] = Order; End for
Order = Order + 1;
} repeat until most (99%) bits in the page are programmed
```

The fingerprints extracted from the same page on the same chip over time are noisy but highly correlated. To compare fingerprints extracted from the same page/chip and different pages/chips, we use the Pearson correlation coefficient, which is defined as $$P(X, Y) = \frac{E[(X - \mu_X)(Y - \mu_Y)]}{\sigma_X \sigma_Y}$$

experiment and Y is another vector of program orders extracted from another experiment. $\mu_x$ and $\sigma_x$ are the mean and standard deviation of the X vector. $\mu_Y$ and $\sigma_Y$ are the mean and standard deviation of the Y vector.

In this way, the vector of program orders is treated as a vector of realizations of a random variable. For vectors extracted from the same page, Y=aX+b+noise where a and b are constants and the noise is small. So, X and Y are highly correlated and the correlation coefficient should be close to 1. For vectors extracted from different pages, X and Y should be nearly independent of each other, so the correlation coefficient should be close to zero. From another perspective, if both X[i] and Y[i] are smaller or bigger than their means, $$(X[i]-\mu_x)(Y[i]-\mu_Y)$$

would be a positive number. If not, it would be a negative number. If X and Y are independent, it is equally likely to be positive and negative so the correlation coefficient would approach 0.

Figure 6A:
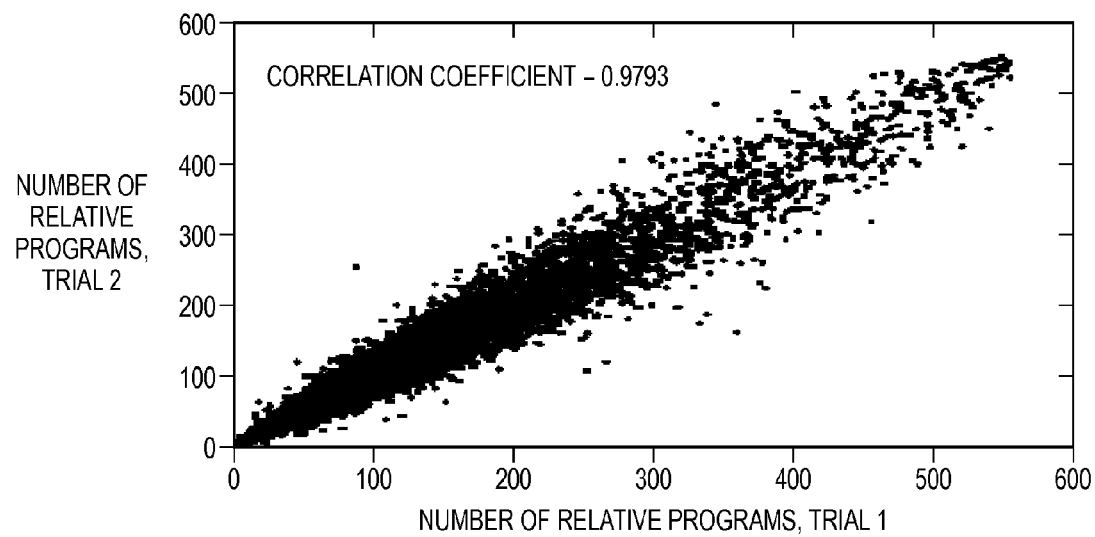
FIGS. 6a, 6b are graphical representations of scatter plot for fingerprints of these teachings extracted on (a) the same page and (b) different chips.
Figure 6B:
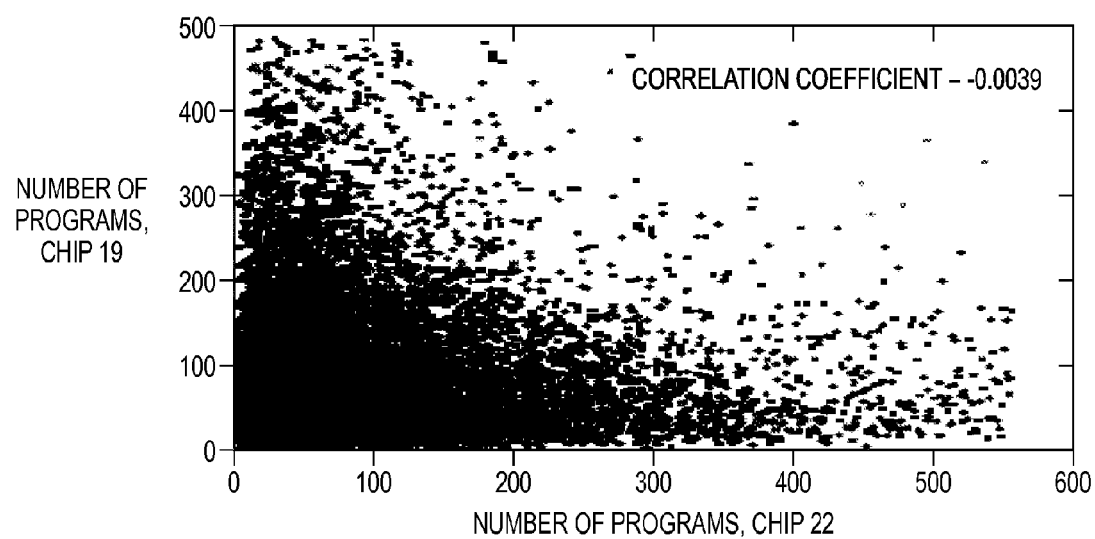

The scatter plot of X and Y from the same page/chip and from different chips are shown in FIG. 6. The figure clearly demonstrates a high correlation between fingerprints from the same chip over time and a low correlation between fingerprints from different chips. Therefore, this correlation metric can be used to compare fingerprints to determine whether they are from the same page/chip or from different pages/chips.

D. Fingerprints in Binary Numbers

The above fingerprints are in the form of the order in which each bit was programmed. If an application requires a binary number such as in generating cryptographic keys, we need to convert the recorded ordering into a binary number.

There are several methods for generating unique and unpredictable binary numbers from the Flash fingerprints. In one instance, a threshold is used to convert a fingerprint based on the programming order into a binary number as shown in Algorithm VI. In the algorithm, 1 is produced if the program order is high, or 0 otherwise. This approach produces a 1 bit fingerprint for each Flash bit. Alternatively, a similar binary fingerprint obtained directly from Flash memory by partially programming (or erasing) a page and reading bits (1/0) from the Flash.

Algorithm VI Generate a binary signature from the partial programming order information.

```
Pick threshold t = Max(BitRank) / 2
For each bit
    If Bit-Rank[bit] > t
        Output 1
    Else Output 0
End for
```

In one or more embodiments, in the method of these teachings for providing a security function using a Flash memory, the security function is data hiding, a characteristic for each group of bits is an average a number of partial programmings required for each group of bits to flip from an erased state to a programmed state, an the method also includes composing a hidden data message by assigning each bit of the hidden data message to one group of bits in the Flash memory from a number of groups of bits; and the partially programming the Flash memory includes repeatedly erasing and partially programming each group of bits from the number of groups a predetermined number of repetitions, the predetermined number of repetitions for each group being selected according to a bit of the hidden data message that is assigned to said each group.

In one instance, the method of these teachings for data hiding using a Flash memory also includes determining the number of partial programmings required for each bit in the number of groups to flip from an erased state to a programmed state. In one embodiment, determining the number of partial programmings required for each bit to flip from an erased state to a programmed state includes:

(a) partially programming the page,
(b) reading one bit,
(c) determining whether the one bit has flipped to the programmed state,
(d) setting the number of partial programmings for the one bit equal to the number of partial programmings performed, if the one bit has flipped to the programmed state;
(e) repeating (b)-(d) until all bits in the page which have not been determined to have flipped are read, and
(f) repeating (a)-(e) a predetermined number of times.

In one embodiment, determining the number of partial programmings required for each bit in the number of groups to flip from an erased state to a programmed state also includes setting, for bits that have not flipped, the number of partial programmings equal to the predetermined number of times plus one.

In one instance, the method of these teachings for data hiding using a Flash memory also includes reconstructing the hidden data message. In one embodiment, reconstructing the hidden data message includes applying two thresholding steps. In one instance, applying two thresholding steps includes determining a median number of partial programmings for all bits within each page, quantizing the number of partial programmings for each bit within a page, dividing bits according to groups from the number of groups, obtaining one average number of partial programmings for each group from the number of groups, setting, in said each group, the number of partial programming to 1 if said one average is less than a predetermined threshold, and setting, in said each group, the number of partial programming to 0 if said one average is at least equal to the predetermined threshold. In one embodiment, quantizing the number of partial programmings includes setting the number of partial programming to 1 if the median number is larger than a predetermined quantizing threshold, and setting the number of partial programming to 0 if the median number is at most equal to the predetermined quantizing threshold. In one instance, the predetermined quantizing threshold is half of the median number.

Figure 7:
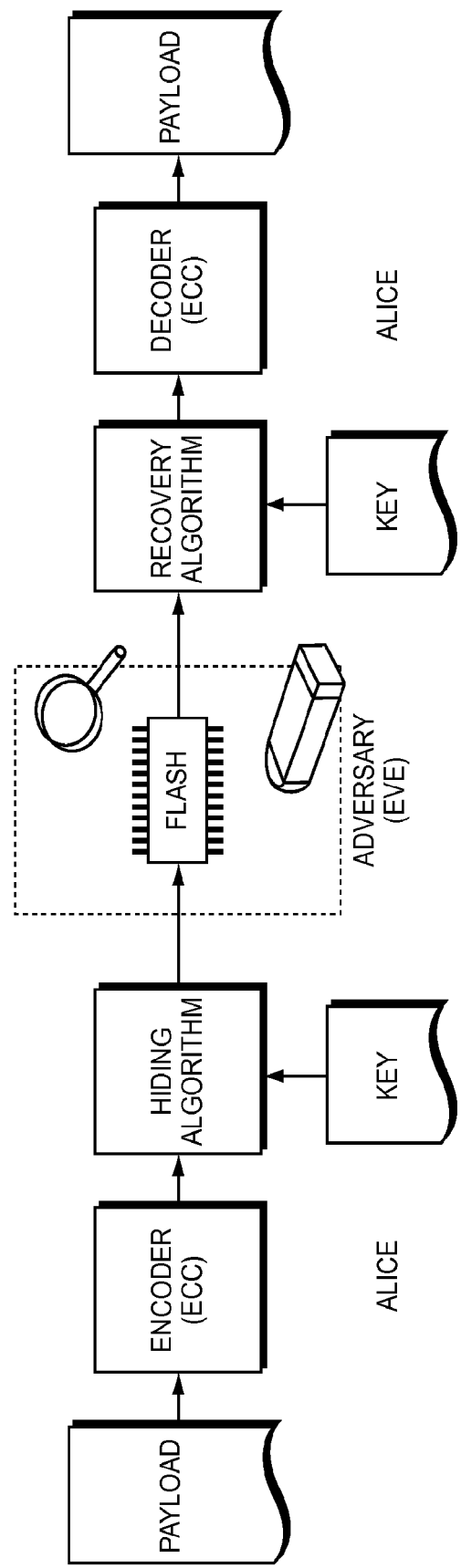
FIG. 7 shows the overview of the information hiding process in Flash memory.

FIG. 7 shows the overview of the information hiding process in Flash memory. In order to hide information in Flash, Alice (left) first adds an error correcting code (ECC) to her message payload and hides the payload in the analog characteristics in Flash memory. Later, Alice (right) can perform the reverse operations to retrieve the hidden payload by recovering bits from the analog characteristics and correct errors using the ECC. The information hiding and recovery algorithms use a secret key (hiding key) to determine where the hidden bits are stored in Flash memory. As error correcting codes are well studied, these teachings relate to the physical encoding and decoding of information in Flash.

As shown in the figure, an adversary (Eve) gets temporary access to the Flash memory after Alice hides information. Although the adversary can inspect and manipulate the memory through its normal interface, physical tampering of the memory is not considered in these teachings. In the simple case, the adversary can check normal Flash operations such as program, erase, and read operations. The adversary may also be aware of the information hiding technique and can specifically check analog characteristics of Flash memory that can be observed through the standard interface.

The goal of the adversary may differ depending on the target application. In particular, the adversary may try to
Detect the existence of hidden information,
Retrieve the hidden information, or
Remove the hidden information.

For example, in the traditional steganography context where Alice is trying to establish a covert communication channel, it is important that the adversary cannot easily detect the existence of hidden information. On the other hand, in the context of storing sensitive information, it is more important that the adversary cannot retrieve information without knowing the hiding key. For watermarking, it should be difficult to erase the hidden information.

Given an unlimited amount of time with the Flash chip, an adversary can break the information hiding scheme by trying the retrieval algorithm on all pages with all possible hiding key values because we assume that an adversary knows our hiding algorithm. Therefore, the goal of the hiding technique is to make the detection, retrieval, and removal of hidden information sufficiently time consuming for an attacker The information hiding method of these teachings hides information in the program time of individual bits of Flash. The program time is the time it takes for a bit to change from the erased state (1) to the programmed state (0). Normally, a Flash memory controller performs a program operation at a page granularity, and the latency of this program operation is determined by the slowest bit in a page to be successfully written. In order to determine the program time for each bit, which we refer to as per-bit program time, we use the partial programming technique that is described in the previous section.

Figure 8:
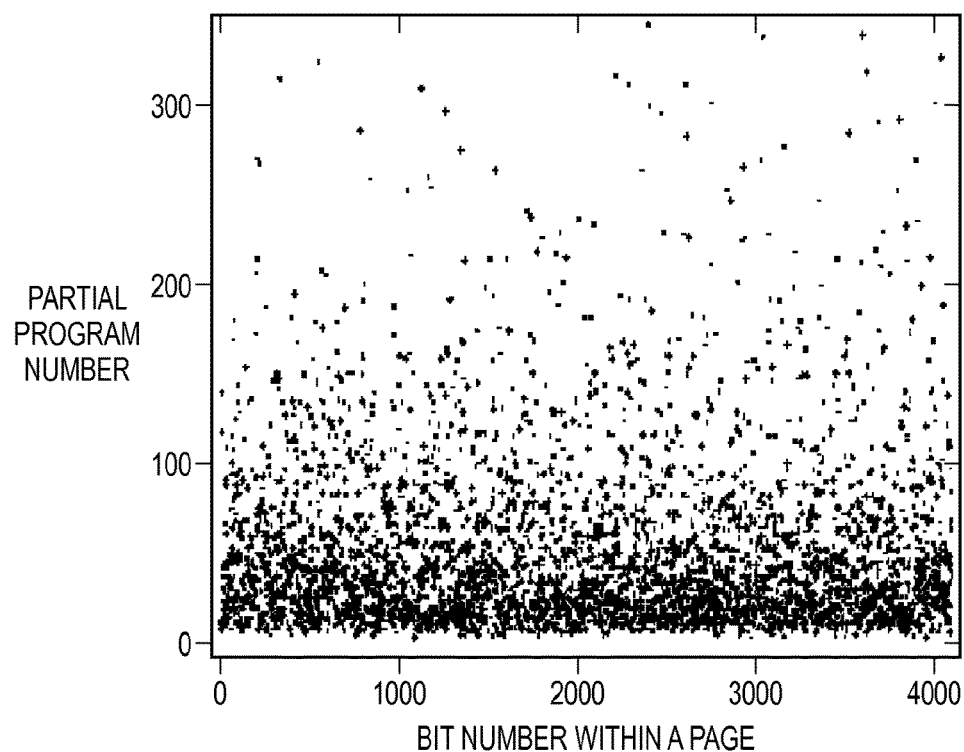
FIG. 8 is a graphical representation of results of partial programming according to these teachings.
Figure 9:
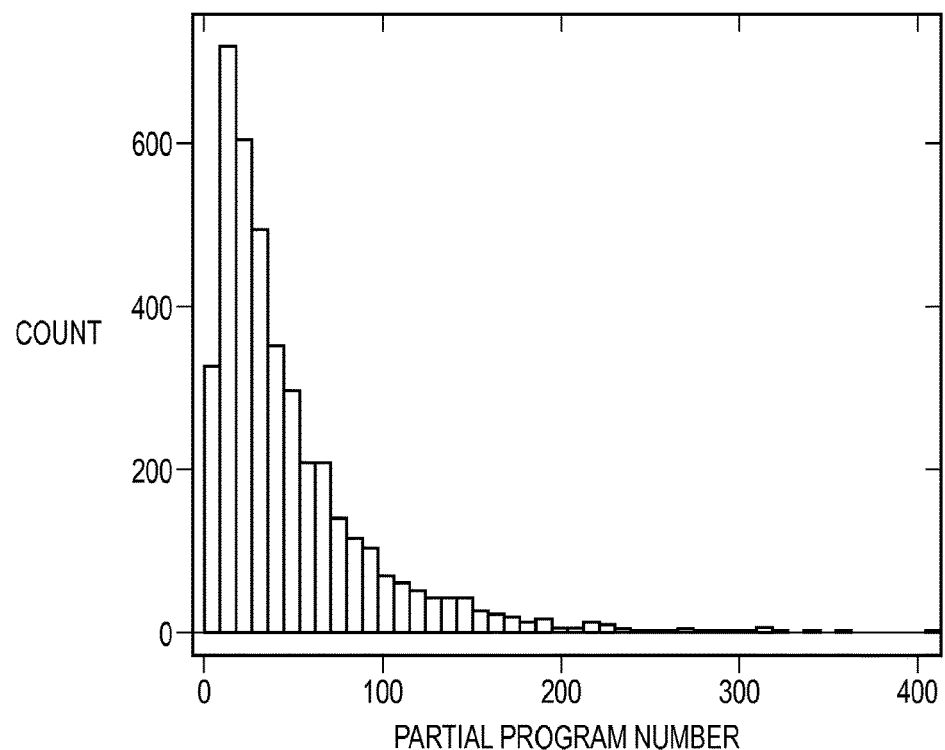
FIG. 9 is a graphical representation of results of partial program time distribution according to the speech.

FIG. 8 shows per-bit program times for a page. The plot shows the number of partial program operations to flip state from 1 to 0 for each bit in a page. Because of process variations, the program time varies widely from bit to bit as shown in the figure. The per-bit program time distribution for the page is shown in FIG. 9. The wide distribution and noisy appearance of per-bit program times suggest that small changes to each bit's program time would go unnoticed, and could be used to carry a covert payload.

However, in order to hide information using the program time, each bit's program time has to be intentionally change and control. Interestingly, in this context, previous work has observed that program time tends to decrease as a Flash cell becomes more worn-out, [9]. In this work, it was also found that how worn-out each bit is can be controlled by selectively stressing a bit. Although one can only program an entire page together, some bits within a page can be stressed more than others by controlling the value that these recent. During an erase operation, every bit in a page is reset to an erased state (for example, assume that the erased state represents '1'). On a program operation, only bits that switch to 0 experience the program stress. When these bits are later erased, they also experience erase stress as they are reverted to the 1 state. Therefore, bits that undergo both switches (1 to 0 and 0 to 1) see the full program and erase stress from one program and erase cycle. However, bits that store 1 will not be switched to the 0 state by a program operation. These bits see much less program and erase stress than their counterparts which are programmed to 0 because their states do not need to change. Therefore, by deciding whether to write a 1 or a 0 to each bit location in a page, which bits are stressed more relative to other bits in the same page can be controlled.

In theory, if every bit had a similar program time without much variation, one bit of information could be hidden in every Flash bit by simply stressing or not stressing the bit so that its program time encodes the hidden bit. However, in practice, the program times of individual bits vary significantly due to manufacturing variations, and intentional stress is often not sufficient to overcome the inherent variations; inherently slow bits will be likely to be still slower than inherently fast bits even after being deliberately stressed. To address this issue, 1 bit of hidden information is encoded using many bits in Flash memory. For each bit to hide, a group of Flash bits and program them to the same value, either 1 or 0. Effectively, this process encodes a bit in the collective program time of the group. The averaging effect reduces variations among different groups and allows the hidden bit to be more reliably recovered.

The use of a group also improves the security of the hiding scheme. In our scheme, we use a key (hiding key) to select which Flash bits will be grouped together for each hidden bit. If an attacker does not know the correct key, he or she cannot accurately identify which bits form a group together. Because an incorrect group is likely to contain both more stressed and less stressed bits, the average program time of an incorrect group of bits will not show a clear bias towards either 1 or 0.

Figure 10:
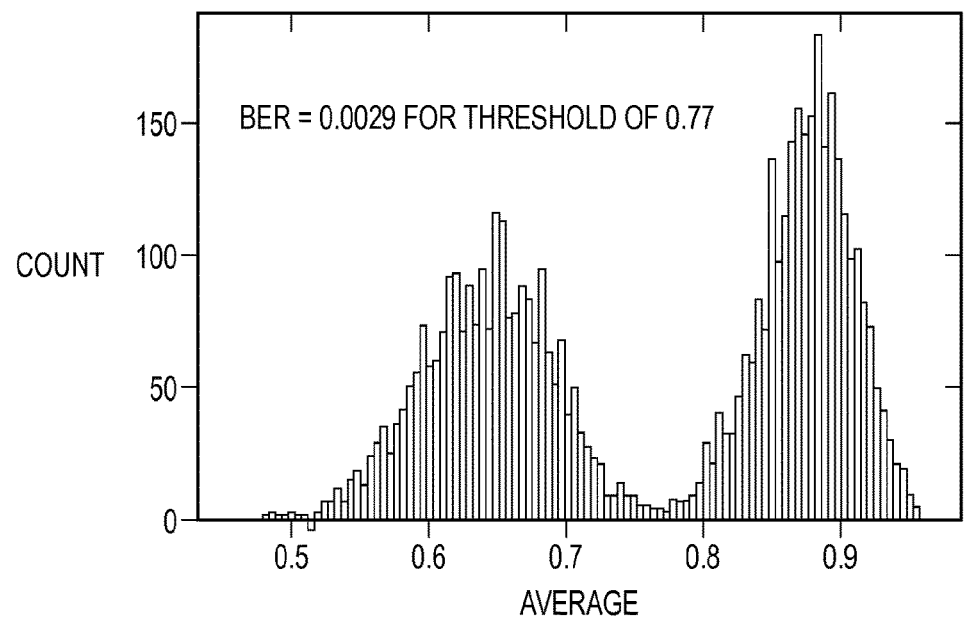
FIG. 10 is a graphical representation of results of average program according to these teachings for the instance in which a stego key is known.

For example, FIG. 10 shows the distribution of the average program time of a correct group. In the experiment, 5120 groups were randomly selected, each of which has 128 bits from a page, and hid either 1 or 0. As shown in the figure, these are an obvious gap in the distribution between the fast and slow groups. Therefore, the value of hidden bits can be easily recovered through a simple thresholding.

Figure 11:
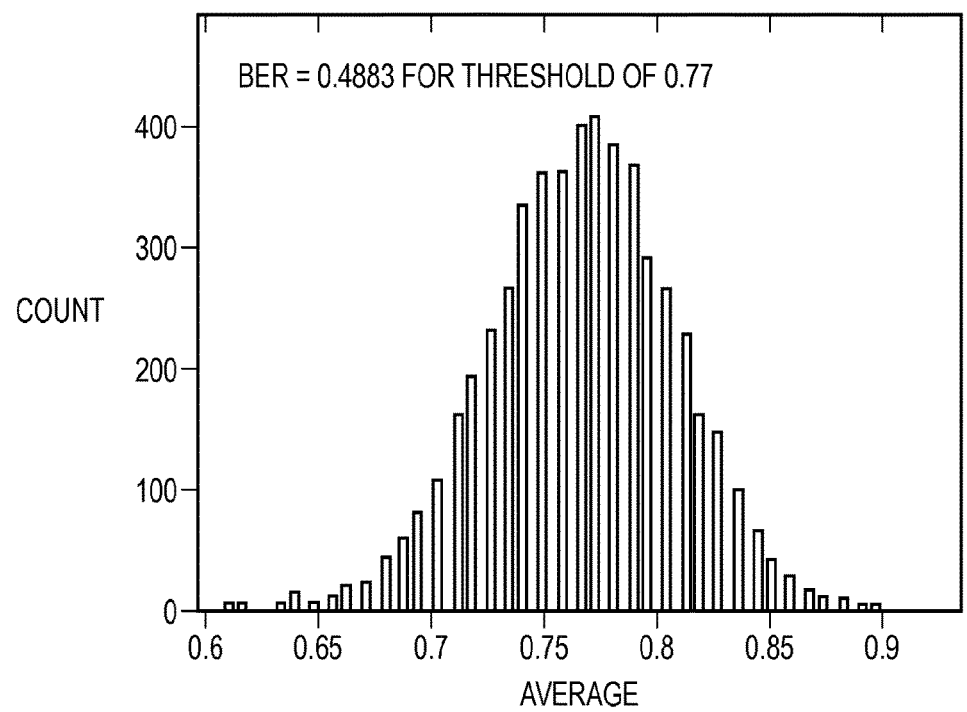
FIG. 11 is a graphical representation of results of average program according to these teachings for the instance in which a stego key is known.

On the other hand, FIG. 11 shows the distribution of the average program time when the hiding key is unknown. For FIG. 11, a randomly selected hiding key was used. As shown in the figure, the average program time of a group shows a normal distribution without any clear separation. This result suggests that it is difficult for an adversary to recover hidden information without correct groupings because each group is likely to have both more and less stressed bits.

FIG. 12 describes the methodology of these teachings for hiding a payload in program time of Flash memory. The algorithm is split into two parts: (A) composing the payload by assigning bits of the message to groups of bits in Flash, and then (B) the actual process of writing the payload to Flash by repeated program and erase stress.

For a given message, first, a set of pages and blocks is chosen in which to encode the message based on the hiding key and the number bits that need to be hidden. Then, the bits within each page were divided into fixed size groups. Each group is used to store one message bit. The page, block, and group selections are based on the hiding key in a way that cannot be predicted without the key. In one instance, RC4 was used to choose the Flash bit locations for each message bit.

Then, the algorithm determines which value (0 or 1) needs to be written to each bit location based on the message bit to be encoded. If a group is to store a "1" value, we will program (write a 0) the bits in the group, and the group will experience full program and erase stresses. If a group is to store a "0" value, the bits in the group will be set to 1, and will see less stress.

With the payload mapped to bits in Flash memory, the actual write (program/erase) was performed to Flash (Part B). A set number of stresses N to exert on the Flash was selected. N is chosen to ensure an acceptable bit error rate without causing excessive stress. Each page is programmed N times in order to imprint the payload into the Flash. In one instance, several hundred to a few thousand PE cycles are sufficient for SLC chips. An even smaller amount of PE cycles are enough for MLC chips.

Recovery Algorithm

FIG. 13 describes the method of these teachings for decoding a payload hidden by the method of these teachings for encoding in Flash bit program time. Again, the method is divided into two parts: (A) physically reading the per-bit program time from Flash, and (B) recomposing the payload from the program time distribution.

To read the hidden information, the program times for every bit in the pages containing the hidden bits must be measured. To do so, the partial programming algorithm described herein above was used. M was chosen such that at the end of M partial programs, more than half of the bits, are programmed. The program time of a bit is expressed as the number of partial program cycles needed to flip the bit from 1 to 0. For the bits that do not flip after the M partial program operations, their program times are set to be a constant above M (i.e. M+1).

To reconstruct the payload from the per-bit program times, two thresholding steps were applied. First, the median program time X across all bits within each page was computed. Then, the program time of each bit within a page is quantized based on the median; if a bit's program time is above half the median program time (X/2), then its program time is set to 1; otherwise it is set to 0. (X/2) was chosen empirically.

The bits are then divided into the groups specified by the hiding key. Within each group, the average of each individual bit's program times (now consisting of only 1 and 0) is computed, and the second thresholding step is performed. Each bit in the payload is set to 1 if the average program time of the corresponding group is below the threshold Th. Otherwise, the bit is set to 0.

In practice, with sufficient hiding PE cycles, the present teachings have shown that there exists an obvious gap between the average program times of the more-stressed and less-stressed groups. As a result, it is straightforward to set the threshold Th to distinguish the two types of groups. For each page, first, the average program time of each group was sorted. Suppose the sequence of sorted program times is X0, X1, X2, . . . , XN. Then, the intervals between the sorted average program times was calculated and X1-X0, X2-X1, . . . obtained. Suppose the maximum interval is XM-XL, then the threshold is set to be in the middle of that interval; Th=(XM+XL)/2. In this way, a per-page threshold can be obtained. For the cases with low hiding PE cycles, where there is no clear gap between the two clusters, the threshold is set to be a constant across pages based on the histogram of the average program times from multiple blocks.

For simplicity, the algorithm was described and evaluated for the case where all bits within a selected page are used to hide bits. In order to make detection more difficult, it is also possible to only use a small subset of bits within a page.

Figure 14:
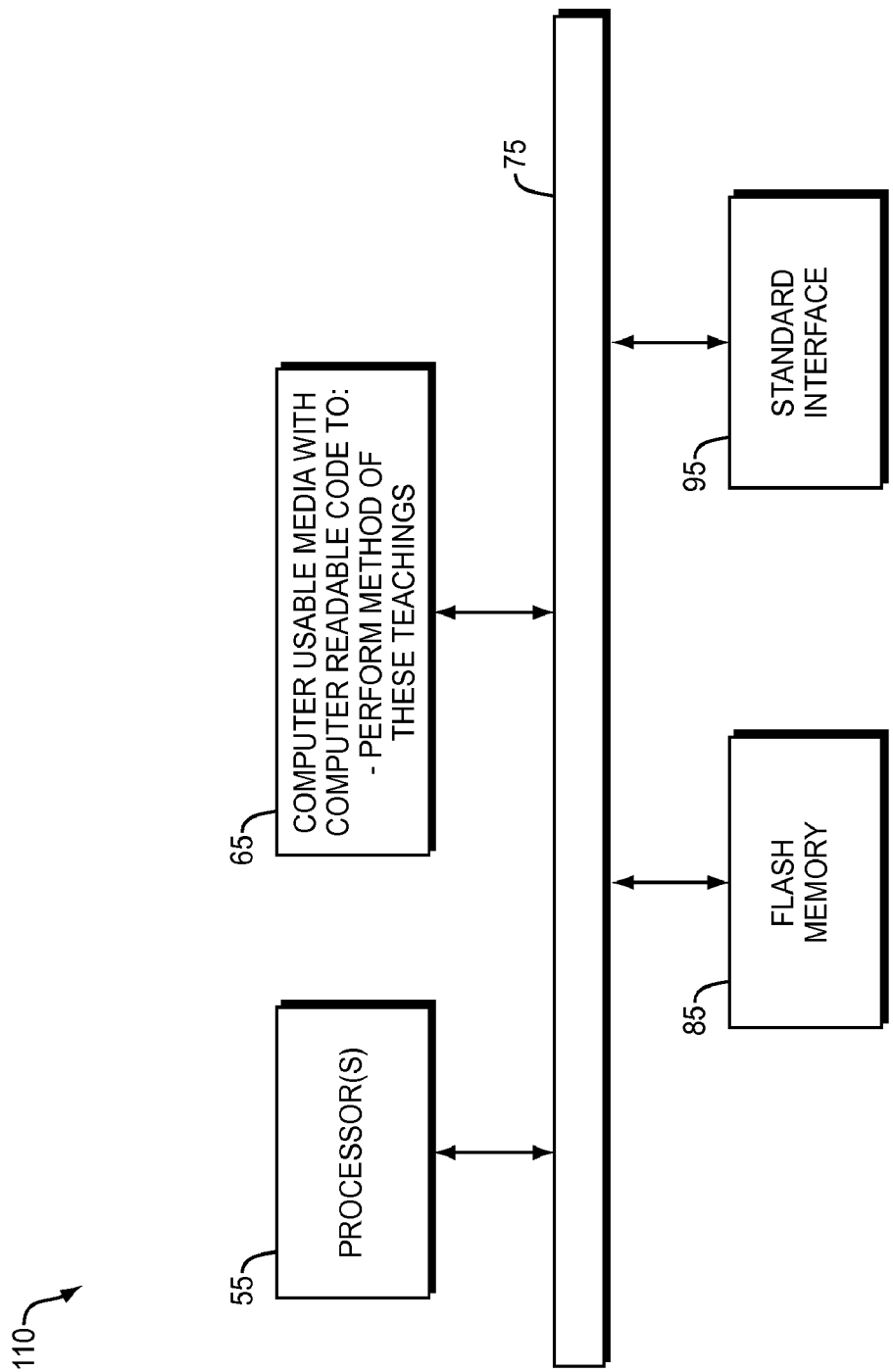
FIG. 14 is a flow diagram representation of one embodiment of the system of these teachings.

An embodiment of the system of these teachings is shown in FIG. 14. Referring to FIG. 14, in the embodiment shown therein, the system of these teachings 110 for providing a security function using a Flash memory 85 includes one or more processors 55 and one or more computer usable media 65, the computer usable media having computer readable code embodied therein, the computer readable code, when executed by the processors 55, performs the method of these teachings for providing a security function using a Flash memory. The embodiment shown in FIG. 14 also includes a component 95 to provide a standard interface (such as, but not limited to, USB) and the processors 55, the computer usable media 65, the flash memory 85 and the component 95 are operatively connected by a connection component 75 (such as, but not limited to a computer bus). It should be noted that the Flash memory 85 can include a socket for mounting the Flash memory and a Flash memory mounted on the socket.

In one embodiment, the computer readable code, when executed by the processors, results in partially programming the Flash memory, observing characteristics resulting from the partially programming and at least one read operation subsequent to partial programming, the characteristics being used to perform the security function.

In one instance, the security function is random number generation or fingerprinting; and partial programming includes (i) partially programming one or more pages of the Flash memory, (ii) reading said the one or more pages, and repeating (i) and (ii) until changes in bit value are observed. In another instance, observing characteristics includes observing a number of partial programming operations required for a predetermined event.

In one embodiment of the system of these teachings for providing a random number generator using a Flash memory, the characteristics are a number of consecutive reads in an erased state ("1") and a number of consecutive reads in a programmed state ("0"), the partially programming the Flash memory and the observing the characteristics include erasing a block, partially programming a page, identifying bits in the page that exhibit Random Telegraph Noise (RTN) or RTN and thermal noise, determining the number of consecutive reads in an erased state ("1") and the number of consecutive reads in a programmed state ("0") for the identified bits, generating a sequence of the number of consecutive reads in an erased state and the number of consecutive reads in a programmed state for the identified bits; and converting the sequence into a binary number sequence for the identified bits. In some embodiments, partially programming a page comprises partially programming a page a predetermined number of times.

In one instance of the system of these teachings for providing random number generation using a Flash memory, identifying bits, as performed by executing the computer readable code in the one or more processors, includes:

(a) reading a predetermined number of bytes in the page;

(b) repeating (a) a predetermined number of times;

(c) recording an outcome of the reading for each bit in the predetermined number of bytes;

(d) determining, if the bit in the predetermined number of bytes is not selected, whether the bit is selected for random number generation;

(e) recording a number of times the bit was partially programmed;

(f) identifying, if a bit is selected, whether the bit has Random Telegraph Noise (RTN) or has RTN and thermal noise;

(g) partially programming a page; and (h) repeating (a)-(g) until all bits in the predetermined number of bytes have been considered.

In another instance of the system of these teachings for providing random number generation using a Flash memory, the computer readable code also causes, when executed, the one or more processors to partially program all selected bits so that RTN is observed. In yet another instance of the method of these teachings for providing random number generation using a Flash memory, determining the number of consecutive reads, as performed by executing the computer readable code in the one or more processors, includes reading the selected bits a predetermined number of times, and recording the number of consecutive reads in the erased state and the number of consecutive reads in the programmed state for each selected bit.

In a further instance of the system of these teachings for providing random number generation using a Flash memory, determining whether the bit is selected, as performed by executing the computer readable code in the one or more processors, includes determining whether reading the bit produces a same result a predetermined percent of the number of times, and selecting the bit if the determining is negative.

In another embodiment of the system of these teachings for providing a security function using a Flash memory, the security function is fingerprinting, a characteristic for each bit is a number of partial programmings required for each bit to flip from an erased state to a programmed state, and the partially programming the Flash memory and the observing the characteristics, as performed by executing the computer readable code in the one or more processors, include erasing a page of the Flash memory, and determining, for predetermined percentage of bits in the page, the number of partial programmings required for each bit to flip from an erased state to a programmed state, the predetermined percentage selected so that most bits are programmed, the number of partial programming for each bit in the predetermined percentage constituting a fingerprint for the page and the Flash memory.

In one instance, in the system of these teachings for providing fingerprints using a Flash memory, determining, for predetermined percentage of bits in the page, the number of partial programmings required for each bit to flip from an erased state to a programmed state, as performed by executing the computer readable code in the one or more processors, includes:

(a) partially programming the page;
(b) reading one bit;
(c) determining whether the one bit has flipped to the programmed state;
(d) setting the characteristic for the one bit equal to the number of partial programmings performed, if the one bit has flipped to the programmed state;
(e) repeating (b)-(d) until all bits in the page which have not been determined to have flipped are read; and
(f) repeating (a)-(e) until the predetermined percentage of bits have flipped to the programmed state.

In another instance, in the system of these teachings for providing fingerprints using a Flash memory, the computer readable code also causes, when executed, the one or more processors to generate a binary fingerprint from the number of partial programmings required for each bit to flip from an erased state to a programmed state.

In one instance, in the system of these teachings for data hiding using a Flash memory, the computer readable code also causes, when executed, the one or more processors to reconstructing the hidden data message. In one embodiment, reconstructing the hidden data message, as performed by executing the computer readable code in the one or more processors, includes applying two thresholding steps. In one instance, applying two thresholding steps, as performed by executing the computer readable code in the one or more processors, includes determining a median number of partial programmings for all bits within each page, quantizing the number of partial programmings for each bit within a page, dividing bits according to groups from the number of groups, obtaining one average number of partial programmings for each group from the number of groups, setting, in said each group, the number of partial programming to 1 if said one average is less than a predetermined threshold, and setting, in said each group, the number of partial programming to 0 if said one average is at least equal to the predetermined threshold. In one embodiment, quantizing the number of partial programmings includes setting the number of partial programming to 1 if the median number is larger than a predetermined quantizing threshold, and setting the number of partial programming to 0 if the median number is at most equal to the predetermined quantizing threshold. In one instance, the predetermined quantizing threshold is half of the median number.

In one exemplary embodiment, the system of these teachings has is a socket to hold a Flash chip under test, an ARM microprocessor to issue commands and receive data from the Flash chip, and a Maxim MAX-3233 chip to provide a serial (RS-232) interface. USB support is integrated into the ARM microcontroller. We also wrote the code to test the device. The exemplary embodiment represents typical small embedded platforms such as USB flash drives, sensor nodes, etc. This exemplary embodiment shows that the techniques of these teachings can be applied to commercial off-the-shelf devices with no custom integrated circuits (ICs).

The exemplary embodiment was used to demonstrate these teachings with four types of Flash memory chips from Numonyx, Micron and Hynix, as shown in 0.

TABLE I

TESTED FLASH CHIPS

| Manufacturer | Part Number | Capacity | Quantity | Technology |
|---|---|---|---|---|
| Numonyx | NAND04GW3B2DN6 | 4 Gbit | 3 | 57 nm SLC |
| Hynix | HY27UF084G2B | 4 Gbit | 10 | SLC |
| Micron | MT29F2G08ABAEAWP-IT:E 4 | 2 Gbit | 24 | 34 nm SLC |
| Micron | MT29F16G08CBACAWP:C | 16 Gbit | 5 | MLC |

Random Number Generation

The two main metrics for random number generation are randomness and throughput. For security, the RNG must be able to reliably generate true random numbers across a range of environmental conditions over time. For performance, higher throughput will be desirable.

Randomness

Historically, three main randomness test suites exist. The first one is from Donald Knuth's book "The Art of computer Programming (1st edition, 1969)" which is the most quoted reference in statistical testing for RNGs in literature. Although it was a standard for many decades, it appears to be outdated in today's view. The second one is the "diehard" test suite from Florida State University, which has not been maintained in recent years. The third one is developed by National Institute of Standards and Technology (NIST) which is a measurement standard laboratory and a non-regulatory agency of the United States Department of Commerce. The NIST Statistical Test Suite is a package consisting of 15 tests that were developed to test the randomness of arbitrary long binary sequences produced by either hardware or software. The test suite makes use of both existing algorithms from past literatures and newly developed tests. The most updated version, sts-2.1.1, which was released in Aug. 11, 2010, is used in randomness tests in the use of the exemplary embodiment.

FIG. 15 shows one test result for the even-odd scheme, which only used an LSB from the up-time and down-time, when bits with both RTN and thermal noise are used. 10 sequences generated from multiple bits are tested and each sequence consists of 600,000 bits. Note that some of the results are not shown here due to the space constraint. NonOverlappingTemplate, RandomExcursions and RandomExcursionsVariant have a lot of tests. In the result above, the proportion in the second column shows the proportion of the sequences which passed the test. If the proportion is greater than or equal to the threshold value specified at the bottom of the figure (8 out of 10 or 4 out of 5), then the data is considered random. The P-value in the first column indicates the uniformity of the P-values calculated in each test. If P-value is greater than or equal to 0.0001, the sequences can be considered to be uniformly distributed. The result indicates that the proposed RNG passes all the NIST tests.

Random numbers from one bit with only RTN behavior were also tested, using multiple bits from up-time and downtime. In this case, ten 200,000-bit sequences from one bit were generated. The data passed all NIST tests with results that are similar to the above case. For the Universal test, which requires a sequence longer than 387,840 bits, five 500,000-bit sequences were used.

2) Performance

The throughput of the proposed RNG varies significantly depending on the switching rate of individual bits, sampling speed and environment conditions. Typically, only a small fraction of bits show pure RTN behavior with minimal thermal noise. TABLE 11 shows the performance of Flash chips from four manufacturers. The average throughput ranges from 848 bits/second to 3.37 Kbits/second. Note that the fastest switching trap that can be identified is limited by the reading speed in our experiments.

TABLE II

PERFORMANCE OF BITS WITH PURE RTN BEHAVIOR

| Chip | Hynix SLC | Numonyx SLC | Micron SLC | Micron MLC |
| --- | --- | --- | --- | --- |
| Reading speed (KHz) | 46.51 | 45.25 | 43.10 | 17.78 |
| Number of bits | 303 | 478 | 1030 | 134 |
| Number of bits | 9 | 16 | 5 | 0 |
| Max throughput | 8.03K | 5.35K | 2.71K | — |
| Ave. throughput | 3.27K | 1.79K | 848.29 | — |
| Min throughput | 107.04 | 34.77 | 8.14 | — |

If bits with both RTN and thermal noise are also used, the percentage of bits which can be used for RNG can be much higher. The performance of these bits from the same Flash chips as in the pure RTN case is shown in TABLE III. The average throughputs are higher because thermal noise is high frequency noise.

TABLE III

PERFORMANCE OF BITS WITH BOTH RTN AND THERMAL NOISE.

| Chip | Hynix SLC | Numonyx SLC | Micron SLC | Micron MLC |
| --- | --- | --- | --- | --- |
| Reading speed (KHz) | 46.51 | 45.25 | 43.10 | 17.78 |
| Number of bits | 303 | 478 | 1030 | 134 |
| Number of bits | 27 | 81 | 58 | 28 |
| Max throughput | 11.48K | 9.68K | 10.03K | 3.83K |
| Ave. throughput | 3.28K | 3.87K | 3.53K | 1.26K |
| Min throughput | 28.39 | 10.21 | 8.14 | 55.12 |

In the results from the exemplary embodiment, the RNG throughput is largely limited by the timing of the asynchronous interface which is controlled by an ARM microcontroller with CPU frequency of 60 MHz and the 8-bit bus for a Flash chip. The RNG performance could be much higher if data can be transferred more quickly through the interface. As an example, the average for RTN transition time is reported to range from 1 microsecond to 10 seconds. If a 128 bytes can be read in 6 microseconds which is the ideal random cache read speed for the Micron SLC chips, a RTN bit with 0.1 ms average transition time will give approximately 20 Kbits/second throughput. Note that one page could have multiple RTN bits and the method of these teachings allows using multiple bits in parallel so that the aggregated throughput of an RNG can be much higher. For example, if N bits can be read at a time, in theory, that can increase the throughput by a factor of N.

Fingerprints

For fingerprinting, uniqueness and robustness of fingerprints are of interest. The fingerprint should be unique, which means that fingerprints from different chips or different locations of the same chip must be significantly different—the correlation coefficient should be low. The fingerprint should also be robust, in a sense that fingerprints from a given location of a chip must stay stable over time and even under different environmental conditions—the correlation coefficient should be high.

In the results from the exemplary embodiment detailed below, 24 chips (Micron 34 nm SLC), and 24 pages (6 pages in 4 blocks) from each chip were used. 10 measurements were made from each page. Each page has 16,384 bits.

1) Uniqueness

Figure 16:
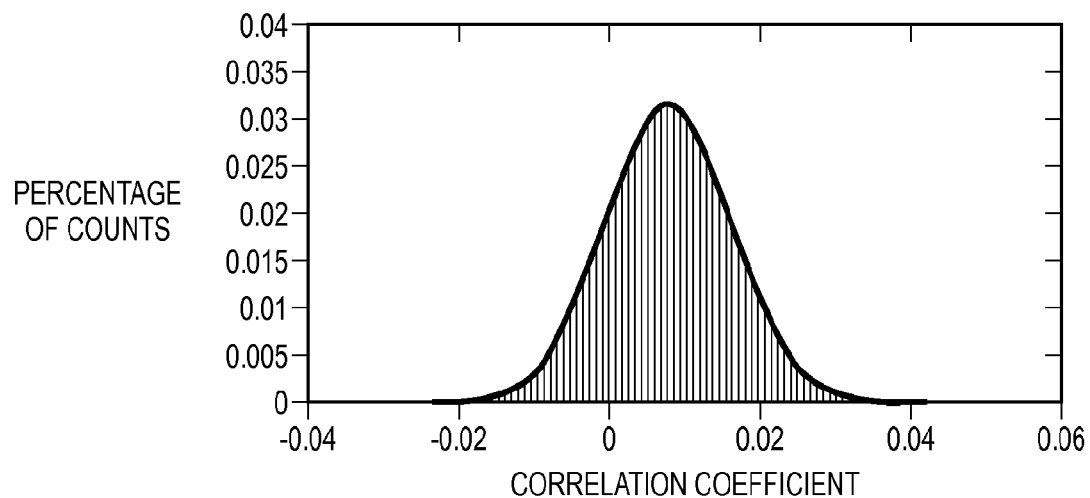
FIG. 16 is a graphical representation of a Histogram of correlation coefficients for pages compared to the same page on a different chip for one exemplary embodiment of these teachings.

To test uniqueness, the fingerprint of a page was compared to the fingerprints of the same page on different chips, and recorded their correlation coefficients. A total of 66,240 pairs were compared—(24 chips choose 2)*24 pages*10 measurements. The results are shown in FIG. 16. The correlation coefficients are very low, with an average of 0.0076. A Gaussian distribution fits the data well.

Figure 17:
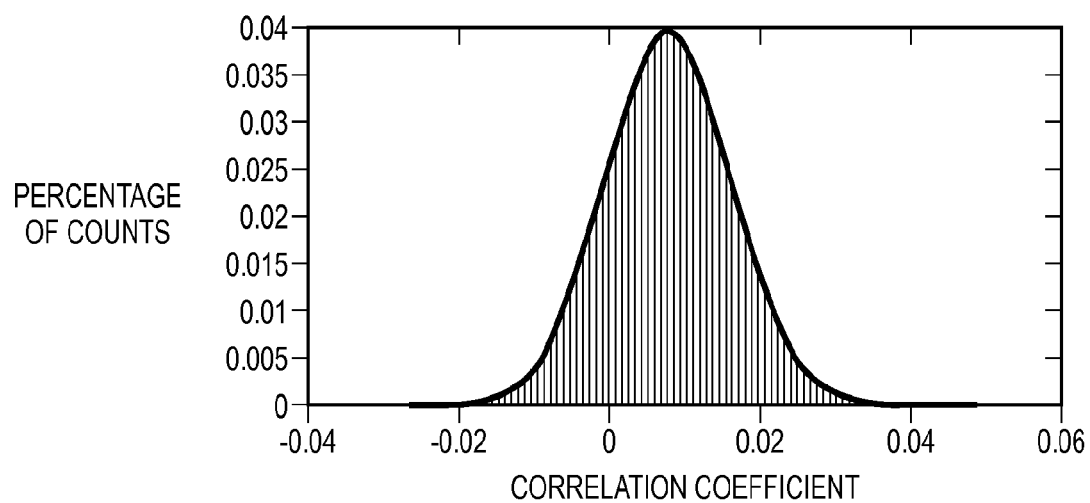
FIG. 17 is a graphical representation of a Histogram of correlation coefficients for every page compared to every other page for one exemplary embodiment of these teachings.

The correlation coefficients are also very low when a page is compared not only to the same page on different chips, but also to different pages on the same and different chips, shown in FIG. 17. There are 1,656,000 pairs in comparison—((24 pages*24 chips) choose 2)*10 measurements. This indicates that fingerprints from different parts (pages) of a chip can be considered as two different fingerprints and do not have much correlation. Therefore, the fingerprinting scheme allows the generation of many independent fingerprints from a single chip.

The average correlation coefficient in this case is 0.0072

2) Robustness

Figure 18:
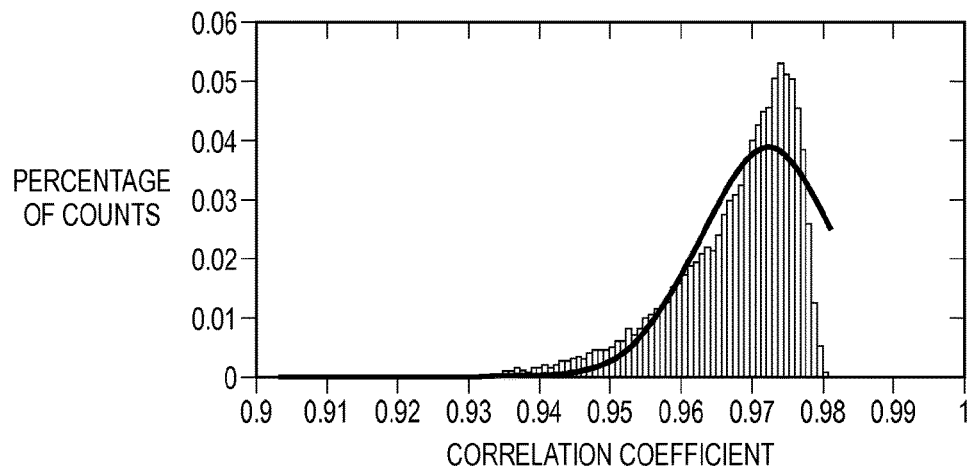
FIG. 18 is a graphical representation of Histogram of correlation coefficients for all intra-chip comparisons for one exemplary embodiment of these teachings.

To test robustness, each page's measurement was compared to the 9 other measurements of the same page's fingerprint (an intra-chip measurement). The histogram of results for all pages is shown in FIG. 18. The correlation coefficient for fingerprints from the same page is very high, with an average of 0.9673. The minimum observed coefficient is 0.9022. The results show that fingerprints from the same page are robust over multiple measurements, and can be easily distinguished from fingerprints of a different chip or page.

To be used in an authentication scheme, a threshold correlation coefficient t could be set. If, when comparing two fingerprints, their correlation coefficient is above t, then the two fingerprints are considered to have come from the same page/chip. If their correlation coefficient is below t, then the fingerprints are assumed to be from different pages/chips.

In such a scheme, there is a potential concern for false positives and false negatives. A false negative is defined as comparing fingerprints that are actually from two different pages/chips, but deciding that the fingerprints are from the same page/chip. A false positive occurs when comparing fingerprints from the same page/chip, yet deciding that the fingerprints came from two different pages/chips. The threshold t can be selected to balance false negatives and positives. A high value of t would minimize false negatives, but increase the chance of false positives, and vice versa.

To estimate the chance of false positives and false negatives, normal probability mass distribution functions was fitted to the correlation coefficient distribution. A false positive would arise from a comparison of two fingerprints from the same page being below t. The normal distribution fitted to the intra-chip comparison data in FIG. 18 has an average p=0.9722 and a std. deviation of 0.0095. For a threshold of t=0.5, the normal distribution function estimates the cumulative probability of a pair of fingerprints having a correlation coefficient below 0.5 as $2.62 \times 10^{-539}$. At t=0.7, the probability is estimated as $7.43 \times 10^{-181}$.

The normal distribution function fitted to the inter-chip comparison data in FIG. 17 has a $\mu=0.0076$ and a std. deviation of 0.0083. The estimated chance of a pair of fingerprints from different chips exceeding t=0.5 is $4.52 \times 10^{-815}$. At t=0.3, the probability is estimated as $6.14 \times 10^{-301}$.

The tight inter-chip and intra-chip correlations along with low probability estimates for false positives or negatives suggest that the size of fingerprints can possibly be reduced. Instead of using all 16,384 bits in a page, a fingerprint can be generated for a 1024-bit, 512-bit, or even only a 256-bit block. Experiments show that the averages of the observed correlation coefficients remain similar to those when using every bit in a page while the standard deviation increases by a factor of 2-3. However, the worst-case false negative estimates remain low. When using 256 bit fingerprints with the threshold t=0.3, the estimate is $7.91 \times 10^{-7}$. Under the same conditions, using 1024 bit fingerprints gives an estimated $3.20 \times 10^{-22}$ chance of a false negative.

Data Hiding

In most results of the exemplary embodiment, only the first 4,096 bits of 16,896-bit pages where use to avoid performance overheads given the limited amount of memory in the microcontroller. The first 4,096 bits will be referred to as a "page" in the following discussion. For the analyses of per-page read/program time and per-block erase time, the entire page was used.

Robustness—Bit Error Rate

Hereinbelow, first, results indicative of whether the proposed scheme can reliably hide and recover bits in the program time characteristics are present. The bit error rate (BER) is used as the metric for measuring robustness. To measure the BER, a randomly generated message was hidden into Flash memory and compared the retrieved message with the original.

In the baseline experiment, the first 4,096 bits of a page were used and divided them into 32 groups (128 bits each) based on a randomly selected hiding key. Then, multiple pages and blocks across a Flash chip were selected to form 5,120 groups, which represent 5,120 hidden bits, and stored bits using 5,000 program and erase (PE) cycles in the encoding process. In this case, a bit error rate (BER) of 0.0029 (0.29%) was obtained.

Figure 19:
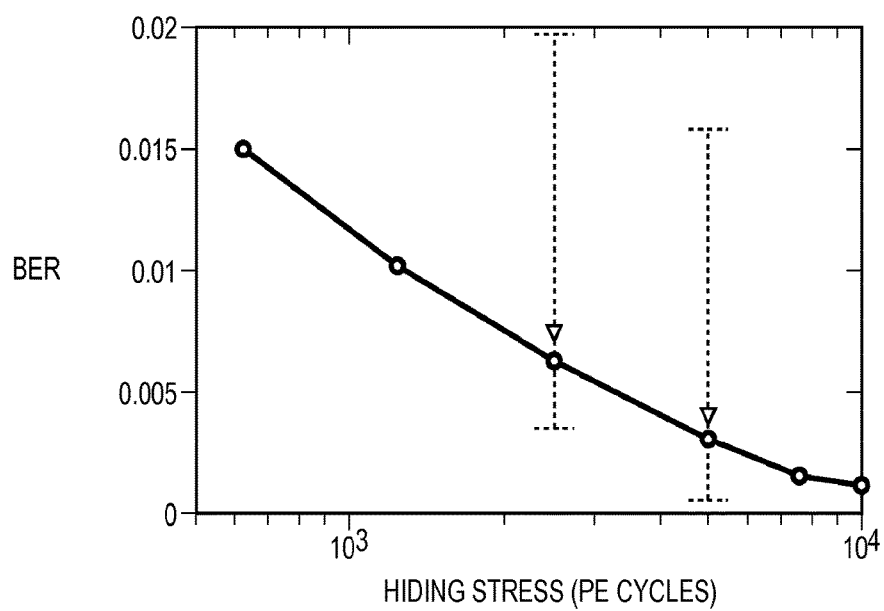
FIG. 19 is a graphical representation of results showing Influence of hiding stress on BER for one exemplary embodiment of these teachings.

FIG. 19 shows the BER as a function of hiding stress, which is the number of program/erase (PE) cycles used to stress each group in the hiding process. The blue line shows the average BER using a single Micron 4 Gbit chip. For each data point in the figure, the BER is computed over 5,120 bits of hidden information with the group size of 128 bits. For hiding stress levels of 2,500 and 5,000 PE cycles, the statistics across 15 Flash chips are also shown; the triangles show the average BER and the error bars show the maximum and minimum BERs across the 15 chips. It is apparent that the BER decreases as the hiding stress increases. More stress increases the program time difference between bits hiding 1s and 0s. However, the incremental benefit after 5,000 PE cycles is rather small. Note that the typical lifetime of an SLC Flash chip from the datasheet is 100,000 PE cycles.

Figure 20:
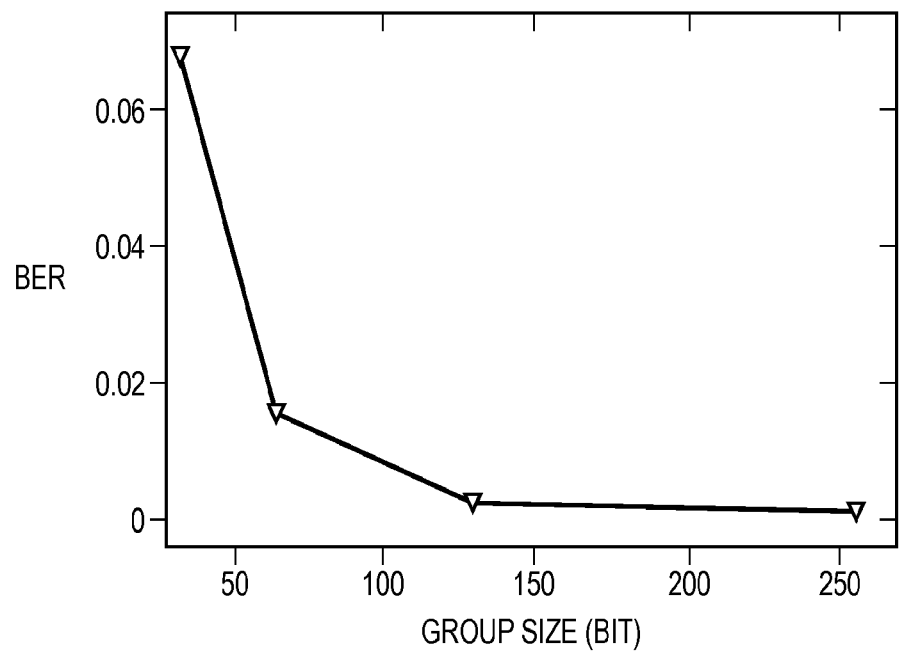
FIG. 20 is a graphical representation of results showing Influence of group size on BER for one exemplary embodiment of these teachings.
Figure 21:
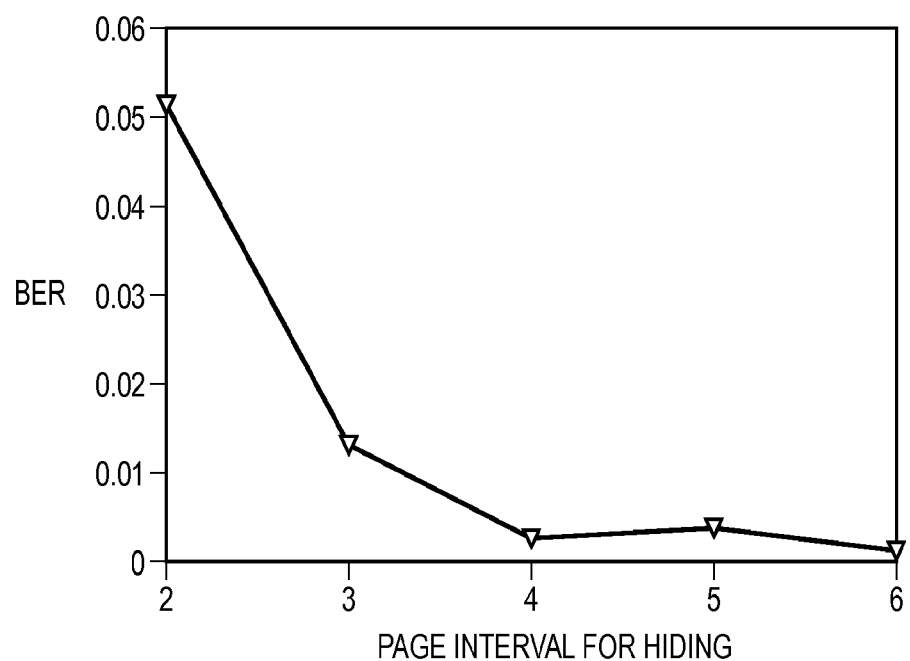
FIG. 21 is a graphical representation of results showing Influence of page interval on BER for one exemplary embodiment of these teachings.

There is also a trade-off between the robustness of the scheme and its hiding capacity. When more physical bits are included in a group, the capacity decreases. On the other hand, the statistical variations among groups will decrease as the group size increases. Therefore, the BER decreases with an increasing group size, as shown in FIG. 20. It is also observed that neighboring pages have a strong influence on each other; stressing one page may also cause some stress in a neighboring page. To solve this problem, only a subset of pages with a specific interval K can be used within a block. If K is 4, then only page 0, page 4, page 8, and so on are used to hide information while the rest is not used. The influence of this page interval on the BER is shown in FIG. 21. The experimental results suggest that there is not much benefit to using a group size beyond 128 and a page interval beyond 4 for these chips. FIG. 20 and FIG. 21 were generated from the 2 Gbit Micron chips, but we present teachings indicate that the group size of 128 and page interval of 4 also work well for the 4 Gbit chips.

Figure 22:
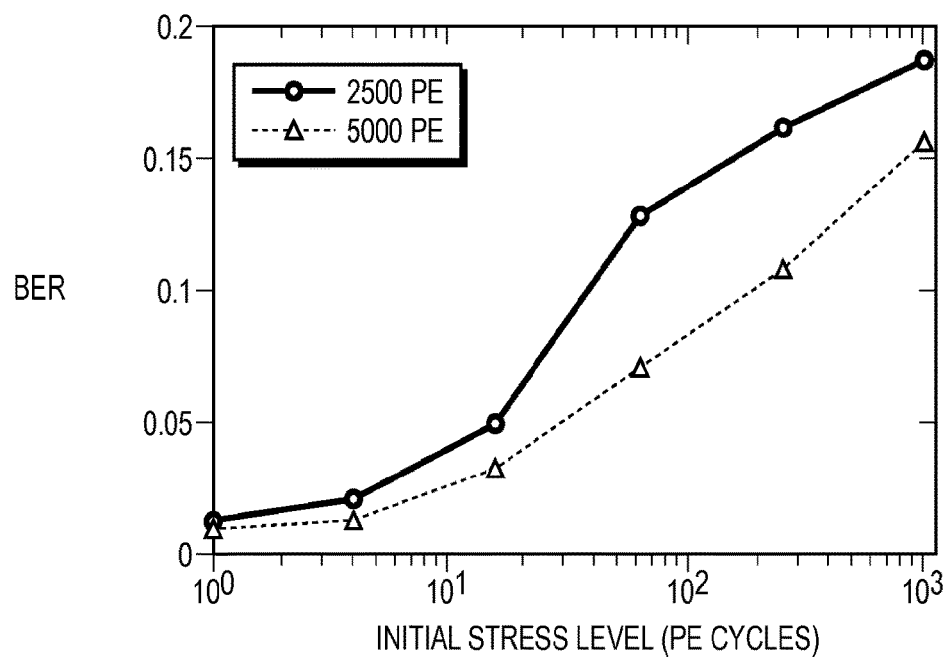
FIG. 22 is a graphical representation of results showing Influence of initial stress level on BER for one exemplary embodiment of these teachings.

The effectiveness of the method on moderately used Flash chips is also studied. The influence of the initial stress level before the encoding process on the BER is shown in FIG. 22. Here, the object is to simulate the normal usage of the Flash chip. So, in each program operation for the initial stress, random data are programmed. For example, the BER at the initial stress level of 10 PE cycles shows the error rate when bits are hidden after 10 PE cycles of programming random data. It can be observed that as the initial stress level increases, the BER also increases. However, a higher initial stress level can be tolerated by increasing the stress level in the encoding process. Note that the error rate is still manageable (less than 10-15%) even after hundreds of normal PE cycles.

TABLE IV

RETENTION CHARACTERISTICS
OF THE HIDDEN MESSAGE

|  | 5,000 Hiding PE | 10,000 Hiding PE |
|---|---|---|
| BER after zero retention (1 post PE cycle) | 0.0029 | 0.0021 |
| BER after 2-day retention (3 post PE cycles) | 0.0141 | 0.0035 |
| BER after 3-day retention (5 post PE cycles) | 0.0187 | 0.0045 |
| BER after over a month retention(7 post PE cycles) | 0.0178 | 0.0031 |

The retention characteristics of the hiding scheme are shown in Table IV. Note that since each decoding performs 2 PE cycles, these retention characteristics include impacts from additional PE cycles in addition to the time between information hiding and retrieval. In the first three rows of Table II, the BER increases as retention time and post-hiding PE cycles increase. In the last row, the BER actually decreases a little compared to the third row. The results suggest that the retention time has little effect on the BER. Intuitively, given that the hiding scheme utilizes cell aging, this result is also supported by the fact that a worn-out Flash memory does not recover greatly even after having been left unattended for a long time.

Performance

In the results of the exemplary embodiment, when a whole page is used for hiding, it takes about 123.6 seconds to perform 5,000 PE cycles of hiding stress on a block, which embeds 2,048 bits of information in the block. The hiding throughput is around 16.6 bits/second. The upper limit of the throughput can also be calculated using the page program time and block erase time given in the Flash memory chip datasheet. The typical page program time is 200 microseconds and the typical block erase time is 700 microseconds. With 2,048 hidden bits in 16 pages of a block, the 5,000 PE cycles will take (0.2*16+0.7)*5,000/1,000=19.5 seconds. The throughput will be about 105 bits/second. This is the ideal case which does not include program data transfers and microcontroller overhead. The hiding throughput will also be higher if a smaller number of PE cycles are used for stressing, or if smaller groups are used.

In order to read the hidden information, one needs to obtain per-bit program times using partial programming. The characterization speed depends on the number of partial programs, M, used in the decoding algorithm. For reading hidden bits (decoding), it is only necessary to perform partial programs until more than half of the bits flip. In one instance of the exemplary embodiment, M for decoding is around 30, and it takes around 3.63 seconds to characterize 16 pages, which contain 2,048 hidden bits. Therefore, the read throughput is about 564 bits/second. The read throughput will be higher if the hiding scheme uses a smaller number of Flash bits to encode each hidden bit.

For a detailed analysis to detect hidden bits (see V-D3), one needs to obtain a complete program time distribution with a large M. In the exemplary embodiment, it takes 612.6 seconds to characterize a block using M=1,200 even if data transfer from the microcontroller to the host computer and processing time on the host are ignored. A 4 Gbit Flash memory chip has 4,096 blocks, so obtaining the complete program time distribution of the whole chip will take around 29 days. Higher capacity chips will take even more time to characterize for detection and decoding. For comparison, simply reading the digital content from the 4 Gbit Flash chip will take approximately 4 minutes. Therefore, fully characterizing the entire Flash chip without knowing where hidden information is located is quite time consuming.

It should be noted that, although these teachings have been illustrated by the exemplary embodiment, these teachings are not limited to only that exemplary embodiment.

The method of these teachings can be applied to any Flash or other floating-gate non-volatile memory, as long as one can control read, program (write), and erase operations to specific memory locations (pages and blocks), issue the RESET command and disable internal ECC.

Applications

A. Random Number Generation

The Flash-based random number generator (RNG) of these teachings can either replace or complement software pseudo random number generators in any applications that need sources of randomness. For example, random numbers may be used as nonces in communication protocols to prevent replays or used to generate new cryptographic keys. Effectively, the Flash memory provides the benefits of hardware RNGs for systems without requiring custom RNG circuits. For example, with the technique of these teachings, low-cost embedded systems such as sensor network nodes can easily generate random numbers from Flash/EEPROM. Similarly, virtual machines on servers can obtain true random numbers even without hardware RNGs.

B. Device Authentication

One application of the Flash device fingerprints is to identify and/or authenticate hardware devices themselves similar to the way that we use biometrics to identify humans.

As an example, consider distinguishing genuine Flash memory chips from counterfeits through an untrusted supply chain. Recent articles report multiple incidents of counterfeit Flash devices in practice, such as chips from low-end manufacturers, defective chips, and ones harvested from thrown-away electronics, etc. The counterfeit chips cause a serious concern for consumers in terms of reliability as well as security; counterfeits may contain malicious functions. Counterfeits also damage the brand name for a manufacturer.

The Flash fingerprints can enable authentication of genuine chips without any additional hardware modifications to today's Flash chips. In a simple protocol, a Flash manufacturer can put an identifier (ID) to a genuine chip (write to a location in Flash memory), generate a fingerprint from the chip, and store the fingerprint in a database along with the ID. To check the authenticity of a Flash chip from a supply chain, a customer can regenerate a fingerprint and query the manufacturer's database to see if it matches the saved fingerprint.

In order to pass the check, a counterfeit chip needs to produce the same fingerprint as a genuine one. Interestingly, unlike simple identifiers and keys stored in memory, device fingerprints based on random manufacturing variations cannot be controlled even when a desired fingerprint is known. For example, even legitimate Flash manufacturers cannot precisely control individual transistor threshold voltages, which we use to generate fingerprints. To produce specific fingerprints, one will need to create a custom chip that stores the fingerprints and emulates Flash responses.

Figure 23:
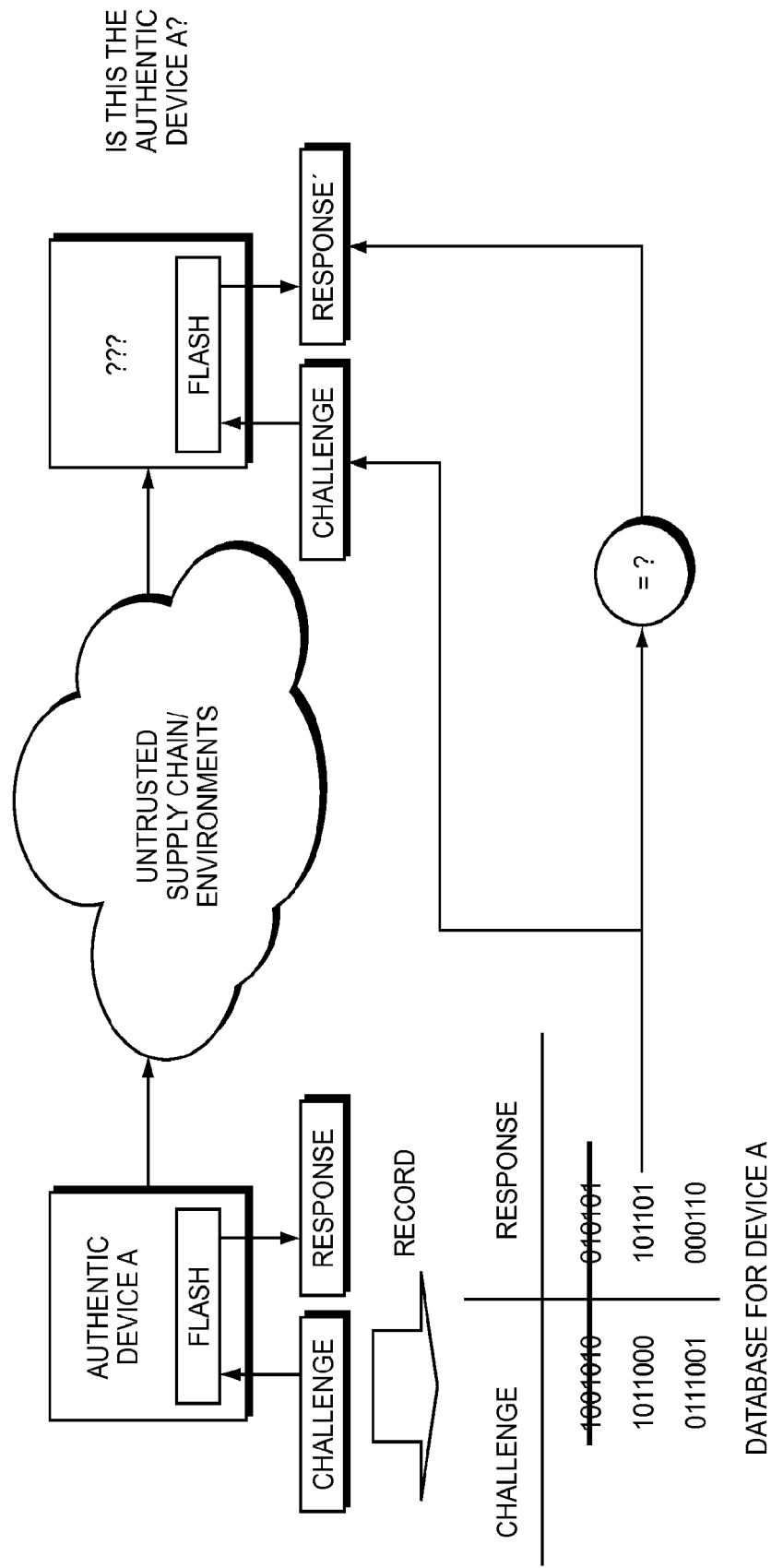
FIG. 23 represents a schematic flow diagram for a method of these teachings for device authentication through a challenge-response protocol.

The authentication scheme can be strengthened against emulation attacks by exploiting a large number of bits in Flash memory. FIG. 23 illustrates a modified protocol that utilizes a large number of fingerprints that can be generated from each Flash chip. Here, we consider a Flash chip as a function where a different set of bits that are used to generate a fingerprint is a challenge, and the resulting fingerprint is a response. A device manufacturer, when in possession of a genuine IC, applies randomly chosen challenges to obtain responses. Then, these challenge-response pairs (CRP) are stored in a database for future authentication operations. To check the authenticity of an IC later, a CRP that has been previously recorded but has never been used for a check is selected from the database, and a re-generated response from a device can be checked.

Unless an adversary can predict which CRPs will be used for authentication, the adversary needs to measure all (or at least a large fraction) of possible fingerprints from an authentic Flash chip and store them in an emulator. In our prototype board, a generation of all fingerprints from a single page (16K bits) takes about 10 seconds and requires 10 bits of storage for each Flash bit. For a 16 Gbit (2 GB) Flash chip, which is a moderate size by today's standards, this implies that fully characterizing the chip will take hundreds of days and 20 GB storage. In the context of counterfeiting, such costs are likely to be high enough to make producing counterfeits economically unattractive.

The security of the authentication scheme based on Flash fingerprints can be further improved if an additional control can be added to the Flash interface. For example, imagine using a USB Flash memory as a two-factor authentication token by updating its firmware to have a challenge-response interface for Flash fingerprints. Given that authentication operations only need to be infrequent, the USB stick can be configured to only allow a query every few seconds.

If a fingerprint is based on 1024 Flash bits, fully characterizing an 8 GB USB stick can take tens of years.

C. Cryptographic Keys

In addition to device identification and authentication, the Flash fingerprints can be used as a way to produce many independent secret keys without additional storage. In effect, the proposed Flash fingerprints provide unpredictable and persistent numbers for each device. Previous studies such as fuzzy extractors and Physical Unclonable Functions (PUFs) have shown how symmetric keys (uniformly distributed random numbers) can be obtained from biometric data or IC signatures from manufacturing variations by applying hashing and error correction. The same approach can be applied to Flash fingerprints in order to generate reliable cryptographic keys. A typical Flash with a few GB can potentially produce tens of millions of 128-bit symmetric keys.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other memory chip or cartridge, or any other non-transitory medium from which a computer can read. As stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

Although the invention has been described with respect to various embodiments, it should be realized these teachings are also capable of a wide variety of further and other embodiments within the spirit and scope of the appended claims.

What is claimed is:

1. A method for providing a security function using a Flash memory, the method comprising:
    partially programming the Flash memory; and
    observing characteristics resulting from the partial programming and at least one read operation subsequent to the partial programming; the characteristics being used to perform the security function;
    wherein the security function is random number generation using Random Telegraph Noise (RTN) as a source of randomness;
    wherein the partially programming comprises:
        partially programming at least one page of the Flash memory;
        reading said at least one page of the Flash memory; and
        repeating above two steps until changes in bit value are observed;
    wherein observing characteristics comprises observing a number of partial programming operations required for a predetermined event;
    wherein the characteristics are a number of consecutive reads in an erased state ("up-time") and a number of consecutive reads in a programmed state ("down-time"); and wherein the partially programming the Flash memory and the observing the characteristics comprises:
        erasing a block;
        partially programming a page;
        identifying bits in the page that exhibit Random Telegraph Noise (RTN) or RTN and thermal noise; an output of identifying bits being identified bits;
        determining the number of consecutive reads in the erased state ("up-time") and the number of consecutive reads in the programmed state ("down-time") for each of the identified bits;
        generating a sequence of the number of consecutive reads in the erased state and the number of consecutive reads in the programmed state for each of the identified bits; and
        converting the sequence into a binary number sequence for the identified bits; said binary number sequence being a random number;
    wherein the method does not use an analog-to-digital (A/D) converter.

2. The method of claim 1 wherein identifying bits comprises:
    (a) reading a predetermined number of bytes in the page;
    (b) repeating (a) a predetermined number of times;
    (c) recording an outcome of the reading for each bit in the predetermined number of bytes;
    (d) determining, if each bit in the predetermined number of bytes is not yet selected for random number generation from RTN, whether each bit is selected for random number generation from RTN;

wherein determining whether said each bit is selected for random number generation from RTN comprises:
    determining whether reading the bit produces a same result a predetermined percent of the number of times; and
    selecting the bit if the determining is negative;
(e) recording a number of times the bit was partially programmed;
(f) identifying, if a bit is selected, whether the bit has Random Telegraph Noise (RTN) or has RTN and thermal noise;
(g) partially programming the page; and
(h) repeating (a)-(g) until all bits in the predetermined number of bytes have been considered.

3. The method of claim 2 further comprising partially programming all selected bits so that RTN is observed.

4. The method of claim 3 wherein partially programming all selected bits so that RTN is observed comprises:
    partially programming the page a first preselected number of times; the first preselected number of times being less than a recorded number of times the page was partially programmed; the recorded number of times is the number of partial programs required for the bit to be selected for random number generation from RTN;
    (j) partially programming the page;
    (k) reading the bit the predetermined number of times;
    (l) determining a maximum and a minimum for moving averages; the moving averages used in checking RTN behavior; the maximum and minimum for moving averages is also used in checking RTN behavior;
    (m) determining whether the maximum for moving averages is greater than a first predetermined threshold and the minimum for moving averages is less than a second predetermined threshold; and
    repeating (j)-(m) until the maximum for moving averages is greater than the first predetermined threshold and the minimum for moving averages is less than the second predetermined threshold and a number of repetitions is at most equal to a second preselected number of times; the second preselected number of times being selected to end repetition when bits are overprogrammed.

5. The method of claim 2 wherein determining the number of consecutive reads comprises: reading the selected bits a predetermined number of times; and
    recording the number of consecutive reads in the erased state and the number of consecutive reads in the programmed state for each selected bit.

6. The method of claim 2 wherein identifying whether the bit has RTN or RTN plus thermal noise comprises:
    obtaining a power spectral density for the up-time or down-time; comparing a slope of the power spectral density for frequencies higher than a predetermined frequency to a predetermined threshold;
    identifying as having RTN if the slope is at least equal to the predetermined threshold; and
    identifying as having RTN plus thermal noise if slope is less than the predetermined threshold.

7. The method of claim 1 wherein partially programming the page comprises partially programming the page a predetermined number of times.

8. A method for providing a security function using a Flash memory, the method comprising:
    partially programming the Flash memory; and
    observing characteristics resulting from the partial programming and at least one read operation subsequent to the partial programming; the characteristics being used to perform the security function;
    wherein the security function is fingerprinting; wherein a characteristic for each bit is a number of partial programmings required for said each bit to flip from an erased state to a programmed state; and wherein the partially programming the Flash memory and the observing the characteristics comprise:
    erasing a page of the Flash memory; and determining, for a predetermined percentage of bits in the page, the number of partial programmings required for each bit to flip from an erased state to a programmed state;
    wherein the number of partial programming for each bit in the predetermined percentage constitutes a fingerprint for the page and the Flash memory.

9. The method of claim 8 wherein determining, for a predetermined percentage of bits in the page, the number of partial programmings required for each bit to flip from an erased state to a programmed state comprises:
    (a) partially programming the page;
    (b) reading one bit;
    (c) determining whether the one bit has flipped to the programmed state;
    (d) setting the characteristic for the one bit equal to the number of partial programmings performed, if the one bit has flipped to the programmed state;
    (e) repeating (b)-(d) until all bits in the page which have not been determined to have flipped are read; and
    (i) repeating (a)-(e) until the predetermined percentage of bits have flipped to the programmed state.

10. A method for providing a security function using a Flash memory, the method comprising:
    partially programming the Flash memory; and
    observing characteristics resulting from the partial programming and at least one read operation subsequent to partial programming; the characteristics being used to perform the security function;
    wherein the security function is data hiding; wherein a characteristic for each group of bits is an average of a number of partial programmings required for said each group of bits to flip from an erased state to a programmed state; wherein the data hidden is a predetermined hidden data message; wherein the method further comprises:
    translating the predetermined hidden data message by assigning each bit of the predetermined hidden data message to one group of bits in the Flash memory from a number of groups of bits; and
    wherein the partially programming the Flash memory comprises repeatedly erasing and partially programming each group of bits from the number of groups a predetermined number of repetitions; the predetermined number of repetitions for said each group being selected according to a bit of the predetermined hidden data message that is assigned to said each group.

11. The method of claim 10 further comprising:
    determining the number of partial programmings required for each bit in the number of groups to flip from an erased state to a programmed state.

12. The method of claim 11 wherein determining the number of partial programmings required for each bit to flip from an erased state to a programmed state comprises:
    (a) partially programming the page;
    (b) reading one bit;
    (c) determining whether the one bit has flipped to the programmed state;

(d) setting the number of partial programmings for the one bit equal to the number of partial programmings performed, if the one bit has flipped to the programmed state;
(e) repeating (b)-(d) until all bits in the page which have not been determined to have flipped are read; and
(f) repeating (a)-(e) a predetermined number of times.

13. The method of claim 12 further comprising setting, for bits that have not flipped, the number of partial programmings equal to the predetermined number of times plus one.

14. The method of claim 12 further comprising reconstructing the predetermined hidden data message; wherein reconstructing the predetermined hidden data message comprises applying two thresholding steps; wherein applying two thresholding steps comprises:
   determining a median number of partial programmings for all bits within each page: quantizing the number of partial programmings for each one bit within a page;
   separating bits within the page according to groups; the groups being selected from the plurality of groups of bits;
   obtaining one average number of partial programmings for each group;
   setting, in said each group, the number of partial programming for said each group to 1 if said one average is less than a predetermined threshold; and
   setting, in said each group, the number of partial programming for said each group to 0 if said one average is at least equal to the predetermined threshold.

15. The method of claim 14 wherein quantizing the number of partial programmings for said each one bit comprises:
   setting the number of partial programming for said each one bit to 1 if the median number is larger than a predetermined quantizing threshold; and
   setting the number of partial programming for said each one bit to 0 if the median number is at most equal to the predetermined quantizing threshold.

16. A system for providing a security function using a Flash memory, the system comprising:
   one or more processors, and
   one or more computer usable media having computer readable code embodied therein, the computer readable code causing the one or more processors to:
   partially program the Flash memory;
   observe characteristics resulting from the partial programming and at least one read operation subsequent to the partial programming;
   wherein observing characteristics comprises observing a number of partial programming operations required for a predetermined event; and the characteristics being used to perform the security function;
   wherein the security function is one of random number generation using Random Telegraph Noise (RTN) as a source of randomness or data hiding;
   wherein the system does not include an analog-to-digital (A/D) converter;
   wherein the security function is random number generation;
   wherein, in causing the one or more processors to partial program the Flash memory, the computer readable code causing the one or more processors to:
   partially program at least one page of the Flash memory;
   read said at least one page of the Flash memory; and
   repeat above two steps until changes in hit value are observed;
   wherein the characteristics are a number of consecutive reads in an erased state ("up-time") and a number of consecutive reads in a programmed state ("down-time"); and
   wherein the partially programming the Flash memory and the observing the characteristics, when executed by the one or more processors, comprise:
   erasing a block;
   partially programming a page;
   identifying bits in the page that exhibit Random Telegraph Noise (RTN) or RTN and thermal noise; an output of identifying bits being identified bits;
   determining the number of consecutive reads in the erased state ("up-time") and the number of consecutive reads in the programmed state ("down-time") for the identified bits;
      generating a sequence of the number of consecutive reads in the erased state and the number of consecutive reads in the programmed state for the identified bits; and
      converting the sequence into a binary number sequence for the identified bits; said binary number sequence being a random number.

17. The system of claim 16 wherein identifying bits, when executed by the one or more processors, comprises:
   (a) reading a predetermined number of bytes in the page;
   (b) repeating (a) a predetermined number of times;
   (c) recording an outcome of the reading for each bit in the predetermined number of bytes;
   (d) determining, if said each bit in the predetermined number of bytes is not yet selected for random number generation from RTN, whether said each bit is selected for random number generation;
   wherein determining whether said each bit is selected comprises:
      determining whether reading said each bit produces a same result a predetermined percent of the number of times; and
      selecting said each bit if the determining is negative;
   (e) recording a number of times said each bit was partially programmed;
   (f) identifying, if a bit is selected, whether the bit has Random Telegraph Noise (RTN) or has RTN and thermal noise;
   (g) partially programming the page; and
   (h) repeating (a)-(g) until all bits in the predetermined number of bytes have been considered.

18. The system of claim 17 wherein the computer readable code also causes the one or more processors to partially program all selected bits so that RTN is observed.

19. The system of claim 18 wherein partially programming all selected bits so that RTN is observed, when executed by the one or more processors, comprises:
   partially programming the page a first preselected number of times; the first preselected number of times being less than a recorded number of times the page was partially programmed; the recorded number of times is the number of partial programs required for the bit to be selected for random number generation from RTN; and
   (j) partially programming the page;
   (k) reading the bit the predetermined number of times;
   (l) determining a maximum and a minimum for moving averages; the moving averages used in checking RTN behavior; the maximum and minimum for moving averages is also used in checking RTN behavior;
   (m) determining whether the maximum for moving averages is greater than a first predetermined threshold and the minimum for moving averages is less than a second predetermined threshold; and repeating (j)-(m) until the maximum for moving averages is greater than the first predetermined threshold and the minimum for moving averages is less than the second predetermined threshold and a number of repetitions is at most equal to a second preselected number of times; the second preselected number of times being selected to end repetition when bits are overprogrammed.

20. The system of claim 17 wherein determining the number of consecutive reads in the computer readable code causes the one or more processors to:

read the selected bits a predetermined number of times; and record the number of consecutive reads in the erased state and the number of consecutive reads in the programmed state for each selected bit.

21. The system of claim 17 wherein, in identifying whether the bit has RTN or RTN plus thermal noise, the computer readable code causes the one or more processors to:

obtain a power spectral density for the up-time or down-time;

compare a slope of the power spectral density for frequencies higher than a predetermined frequency to a predetermined threshold;

identify as having RTN if the slope is at least equal to the predetermined threshold; and identify as having RTN plus thermal noise if the slope is less than the predetermined threshold.

22. The system of claim 16 wherein partially programming a page, when executed by the one or more processors, comprises partially programming a page a predetermined number of times.

23. A system for providing a security function using a Flash memory, the system comprising:

one or more processors, and one or more computer usable media having computer readable code embodied therein, the computer readable code causing the one or more processors to:

partially program the Flash memory;

observe characteristics resulting from the partial programming and at least one read operation subsequent to the partial programming;

wherein observing characteristics comprises observing a number of partial programming operations required for a predetermined event; and the characteristics being used to perform the security function;

wherein the security function is one of random number generation using Random Telegraph Noise (RTN) as a source of randomness or data hiding;

wherein the system does not include an analog-to-digital (A/D) converter;

wherein a fingerprint is obtained;

wherein a characteristic for each hit is a number of partial programmings required for said each bit to flip from an erased state to a programmed state; and wherein the partially programming the Flash memory and the observing the characteristics, when executed by the one or more processors, comprise:

erasing a page of the Flash memory; and determining, for a predetermined percentage of bits in the page, the number of partial programmings required for each bit to flip from an erased state to a programmed state;

wherein the number of partial programming for each bit in the predetermined percentage constitutes a fingerprint for the page and the Flash memory.

24. The system of claim 23 wherein determining, for a predetermined percentage of bits in the page, the number of partial programmings required for each bit to flip from an erased state to a programmed state, when executed by the one or more processors, comprises:

(a) partially programming the page;
(b) reading one bit;
(c) determining whether the one bit has flipped to the programmed state;
(d) setting the characteristic for the one bit equal to the number of partial programmings performed, if the one bit has flipped to the programmed state;
(e) repeating (b)-(d) until all bits in the page which have not been determined to have flipped are read; and
(f) repeating (a)-(e) until the predetermined percentage of bits have flipped to the programmed state.

25. A system for providing a security function using a Flash memory, the system comprising:

one or more processors; and one or more computer usable media having computer readable code embodied therein, the computer readable code causing the one or more processors to:

partially program the Flash memory;

observe characteristics resulting from the partial programming and at least one read operation subsequent to partial programming; and the characteristics being used to perform the security function;

wherein the security function is data hiding;

wherein a characteristic for each group of bits is an average of a number of partial programmings required for said each group of bits to flip from an erased state to a programmed state;

wherein the data hidden is a predetermined hidden data message;

wherein the computer readable code further causes the one or more processors to:

translate the predetermined hidden data message by assigning each bit of the predetermined hidden data message to one group of bits in the Flash memory from a number of groups of bits; and wherein the partially programming the Flash memory comprises repeatedly erasing and partially programming each group of bits from the number of groups a predetermined number of repetitions; the predetermined number of repetitions for said each group being selected according to a bit of the predetermined hidden data message that is assigned to said each group.

26. The system of claim 25 wherein the computer readable code further causes the one or more processors to:

determine the number of partial programmings required for each bit in the number of groups to flip from an erased slate to a programmed state.

27. The system of claim 26 wherein determining the number of partial programmings required for each bit to flip from an erased state to a programmed state, when executed by the one or more processors, comprises:

(a) partially programming the page;
(b) reading one bit;
(c) determining whether the one bit has flipped to the programmed state;

(d) setting the number of partial programmings for the one bit equal to the number of partial programmings performed, if the one bit has flipped to the programmed state;

(e) repeating (b)-(d) until all bits in the page which have not been determined to have flipped are read; and (f) repeating (a)-(e) a predetermined number of times.

28. The system of claim 27 wherein the computer readable code further causes the one or more processors to set, for bits that have not flipped, the number of partial programmings equal to the predetermined number of times plus one.

29. The system of claim 25 wherein the computer readable code further causes the one or more processors to reconstruct the predetermined hidden data message; wherein reconstructing the predetermined hidden data message, when executed by the one or more processors, comprises applying two thresholding steps; wherein applying two thresholding steps, when executed by the one or more processors, comprises:

determining a median number of partial programmings for all bits within each page;

quantizing the number of partial programmings for each bit within a page;

separating bits within the page according to groups; the groups being selected from the number of groups of bits;

obtaining one average number of partial programmings for each group:

setting, in said each group, the number of partial programming for said each group to 1 if said one average is less than a predetermined threshold; and setting, in said each group, the number of partial programming for said each group to 0 if said one average is at least equal to the predetermined threshold.

30. The system of claim 29 wherein quantizing the number of partial programmings, when executed by the one or more processors, comprises:

setting the number of partial programming for said one bit to 1 if the median number is larger than a predetermined quantizing threshold; and setting the number of partial programming for said one bit to 0 if the median number is at most equal to the predetermined quantizing threshold.

\* \* \* \* \*